(12) United States Patent
Hosono et al.

(10) Patent No.: US 10,509,896 B2
(45) Date of Patent: Dec. 17, 2019

(54) IMAGE FORMING APPARATUS

(71) Applicant: KONICA MINOLTA, INC., Chiyoda-ku, Tokyo (JP)

(72) Inventors: Masao Hosono, Itami (JP); Kaitaku Ozawa, Nishinomiya (JP); Kenichi Takahashi, Osaka (JP); Toshikazu Kawaguchi, Kobe (JP); Daisuke Nakano, Kobe (JP); Tomoaki Nakajima, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 225 days.

(21) Appl. No.: 15/814,090

(22) Filed: Nov. 15, 2017

(65) Prior Publication Data
US 2018/0165434 A1    Jun. 14, 2018

(30) Foreign Application Priority Data

Dec. 9, 2016  (JP) ................................ 2016-239149

(51) Int. Cl.
*G06F 21/32* (2013.01)
*G03G 15/00* (2006.01)
(Continued)

(52) U.S. Cl.
CPC ......... *G06F 21/32* (2013.01); *G03G 15/5016* (2013.01); *G03G 15/5091* (2013.01);
(Continued)

(58) Field of Classification Search
CPC ......... G06F 21/32; G06F 21/608; H04N 1/00; H04N 1/00488; H04N 1/00411; H04N 2201/0094; G03G 15/5091; G03G 15/5016
See application file for complete search history.

(56) References Cited

U.S. PATENT DOCUMENTS

| 8,135,956 B2 * | 3/2012 | Balfanz ............... G06F 21/6227 |
| | | 713/166 |
| 10,117,623 B2 | 11/2018 | Shimano et al. |

(Continued)

FOREIGN PATENT DOCUMENTS

| CN | 105874461 A | 8/2016 |
| JP | 2009276860 A | 11/2009 |

(Continued)

OTHER PUBLICATIONS

Chinese Office Action (and English language translation thereof) dated May 17, 2019 issued in counterpart Chinese Application No. 201711283433.2.

*Primary Examiner* — Phuoc Tran
(74) *Attorney, Agent, or Firm* — Holtz, Holtz & Volek PC

(57) ABSTRACT

An image forming apparatus including a communication circuit configured to establish proximity communication with a biometric authentication apparatus, a display, and a processor configured to perform authentication processing with biological information detected by the biometric authentication apparatus is provided. The processor is configured to carry out control for reducing a quantity of light output from the display and incident on the biometric authentication apparatus during detection of the biological information by the biometric authentication apparatus when the processor receives information representing optical detection of the biological information by the biometric authentication apparatus from the biometric authentication apparatus through the communication circuit.

20 Claims, 19 Drawing Sheets

(51) Int. Cl.
*H04N 1/00* (2006.01)
*G06F 21/60* (2013.01)

(52) U.S. Cl.
CPC ............ *G06F 21/608* (2013.01); *H04N 1/00* (2013.01); *H04N 1/00411* (2013.01); *H04N 1/00488* (2013.01); *H04N 2201/0094* (2013.01)

(56) References Cited

U.S. PATENT DOCUMENTS

| | | | |
|---|---|---|---|
| 2009/0281432 A1 | 11/2009 | Higuchi et al. | |
| 2018/0173941 A1* | 6/2018 | Shin | G06K 9/00288 |
| 2018/0247142 A1* | 8/2018 | Oda | G06K 9/00885 |

FOREIGN PATENT DOCUMENTS

| | | | |
|---|---|---|---|
| JP | 2014146080 A | 8/2014 | |
| JP | 2015001843 A | 1/2015 | |

\* cited by examiner

IMAGE FORMING APPARATUS

Japanese Patent Application No. 2016-239149 filed on Dec. 9, 2016 including description, claims, drawings, and abstract the entire disclosure is incorporated herein by reference in its entirety.

BACKGROUND

Technological Field

The present disclosure relates to an image forming apparatus and particularly to an image forming apparatus which is capable of communicating with a biometric authentication apparatus which detects biological information.

Description of the Related Art

Various proposals have conventionally been made for a biometric authentication technique in which a part of a body of an individual such as a fingerprint, an iris, or a blood vessel pattern is used as a key. For example, Japanese Laid-Open Patent Publication No. 2015-001843 discloses a biometric authentication apparatus which suggests appropriate arrangement of a living body to be authenticated. Japanese Laid-Open Patent Publication No. 2014-146080 discloses a biometric authentication apparatus which determines with a template, whether or not a living body to be authenticated is arranged. Japanese Laid-Open Patent Publication No. 2009-276860 discloses a biological pattern imaging device which includes a casing having an opening in a size that is about to be covered in a closed state when a biological part is placed thereon and picks up an image of the biological part placed over the opening.

A technique for authenticating a user by making use of an authentication technique in an image forming apparatus such as a multi-functional peripheral (MFP) has conventionally been proposed.

An image forming apparatus may include a display apparatus including a light emitting diode (LED) lamp and/or an operation panel. In biometric authentication, an individual may be authenticated by optically scanning a fingerprint or a luster. If a wavelength of light emitted from the display apparatus and a wavelength of light for detection in biometric authentication coincide with each other, the former light may be mixed in detection light for biometric authentication as noise. Therefore, in the image forming apparatus, light for outputting information may affect biometric authentication.

On the other hand, an image forming apparatus is desirably smaller in size from a point of view of restriction on a footprint in particular when it is used in an office. Therefore, arrangement of a portion outputting information in the vicinity of a location of biometric authentication in an image forming apparatus may be inevitable.

SUMMARY

The present disclosure was made in view of such circumstances. Accordingly, a technique to avoid influence on biometric authentication by light for output of information in an image forming apparatus without increase in size of the image forming apparatus is required.

To achieve at least one of the abovementioned objects, according to an aspect of the present invention, an image forming apparatus reflecting one aspect of the present invention comprises a communication circuit configured to establish proximity communication with a biometric authentication apparatus, a display, and a processor configured to perform authentication processing with biological information detected by the biometric authentication apparatus. The processor is configured to carry out control for reducing a quantity of light from the display incident on the biometric authentication apparatus during detection of the biological information by the biometric authentication apparatus when the processor receives information representing optical detection of the biological information by the biometric authentication apparatus from the biometric authentication apparatus through the communication circuit.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts or components are denoted with the same signs. Their names and functions are also the same, and a description thereof will not be repeated.

[Summary of Disclosure]

Figure 1:
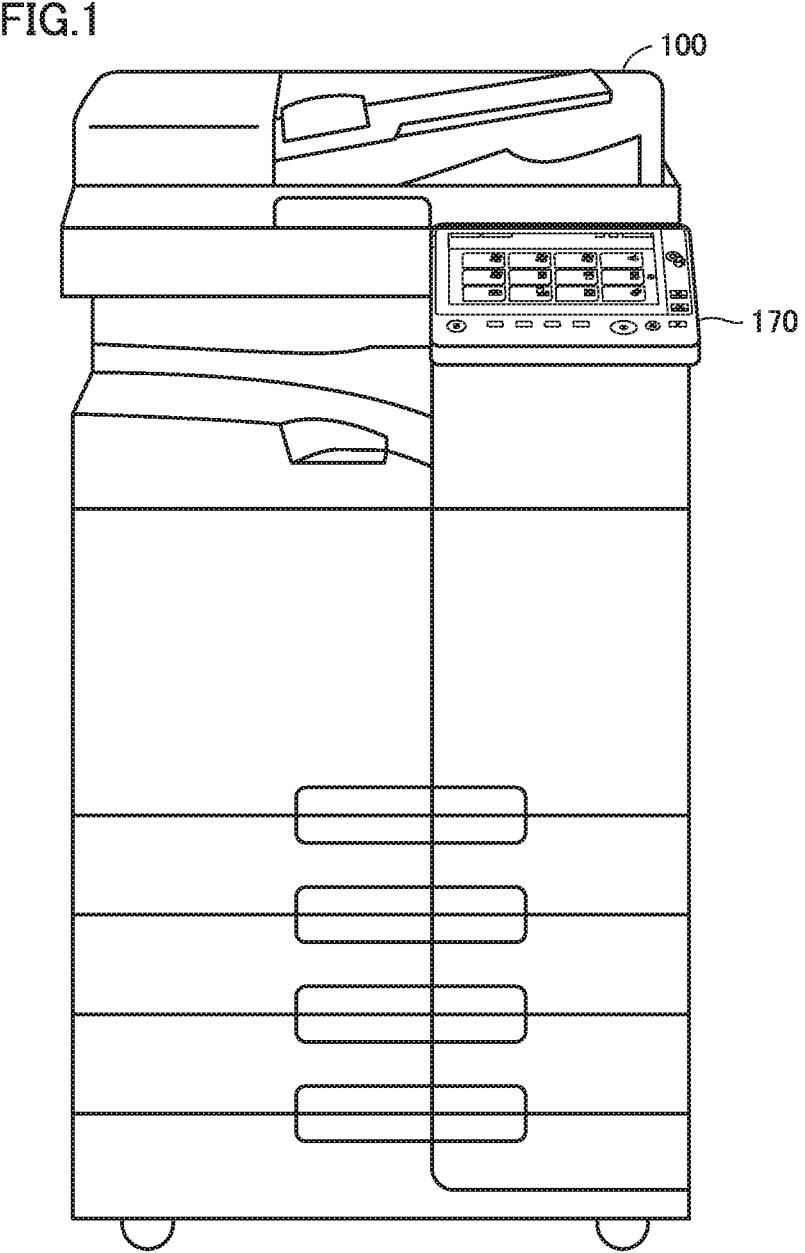
FIG. 1 is a diagram showing appearance of an MFP according to the present disclosure.
Figure 2:
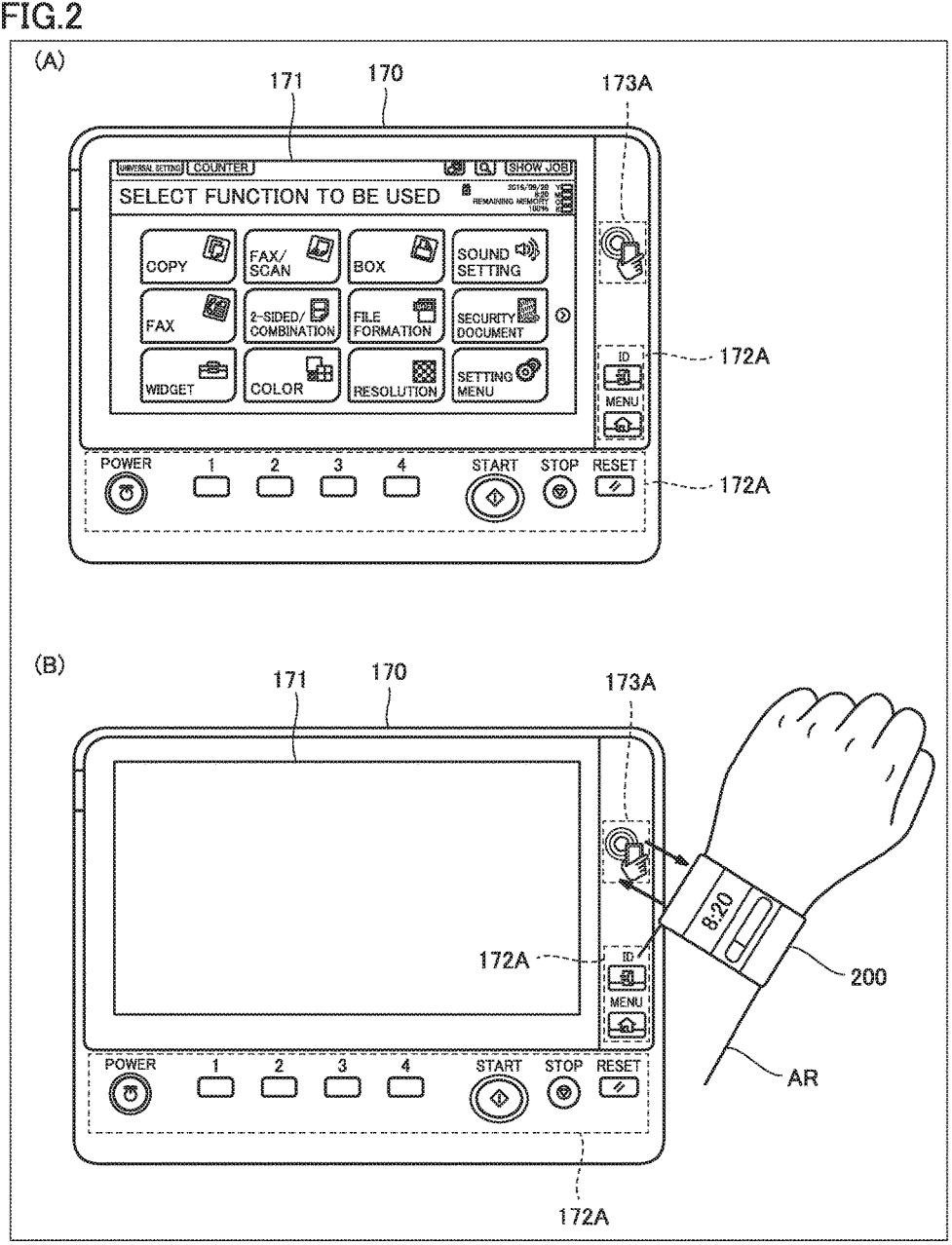
FIG. 2 is a diagram schematically showing a configuration of an operation panel in FIG. 1.

FIG. 1 is a diagram showing appearance of an MFP according to the present disclosure. An MFP 100 shown in FIG. 1 represents one example of an image forming apparatus. MFP 100 includes an operation panel 170. FIG. 2 is a diagram schematically showing a configuration of operation panel 170 an FIG. 1.

As shown in a sub-figure A and a sub-figure B of FIG. 2, operation panel 170 includes a display 171, a hardware key group 172A, and a touch area 173A. Operation panel 170 includes therein, a proximity communication apparatus (a proximity communication portion 173 (FIG. 3) which will be described later) in the vicinity of touch area 173A. Display 171 shown in sub-figure A is turned on and shows a plurality of software keys such as a copy key. Since display 171 shown in sub-figure B is turned off, it does not show a software key.

As shown in sub-figure B, when a user holds a biometric authentication apparatus 200 attached to his/her arm AR over touch area 173A, biometric authentication apparatus 200 communicates with the proximity communication apparatus in operation panel 170.

Biometric authentication apparatus 200 optically detects biological information. Optical scanning of a fingerprint of a user represents one example of detection of biological information. Optical scanning of a luster represents another example. MFP 100 turns off display 171 during a period in which biometric authentication apparatus 200 is detecting biological information as shown in sub-figure B. MFP 100 can thus avoid as much as possible influence by light emitted from display 171 on optical detection of biological information by biometric authentication apparatus 200. When biometric authentication apparatus 200 quits detection of biological information, it transmits the detected biological information to the proximity communication apparatus in operation panel 170. When detection of the biological information by biometric authentication apparatus 200 ends, display 171 is turned on again as shown in sub-figure A.

While biometric authentication apparatus 200 is detecting biological information, display 171 should only at least reduce a quantity of light which the display emits, and the display does not have to be turned off as shown in sub-figure B of FIG. 2.

[Hardware Configuration]

Figure 3:
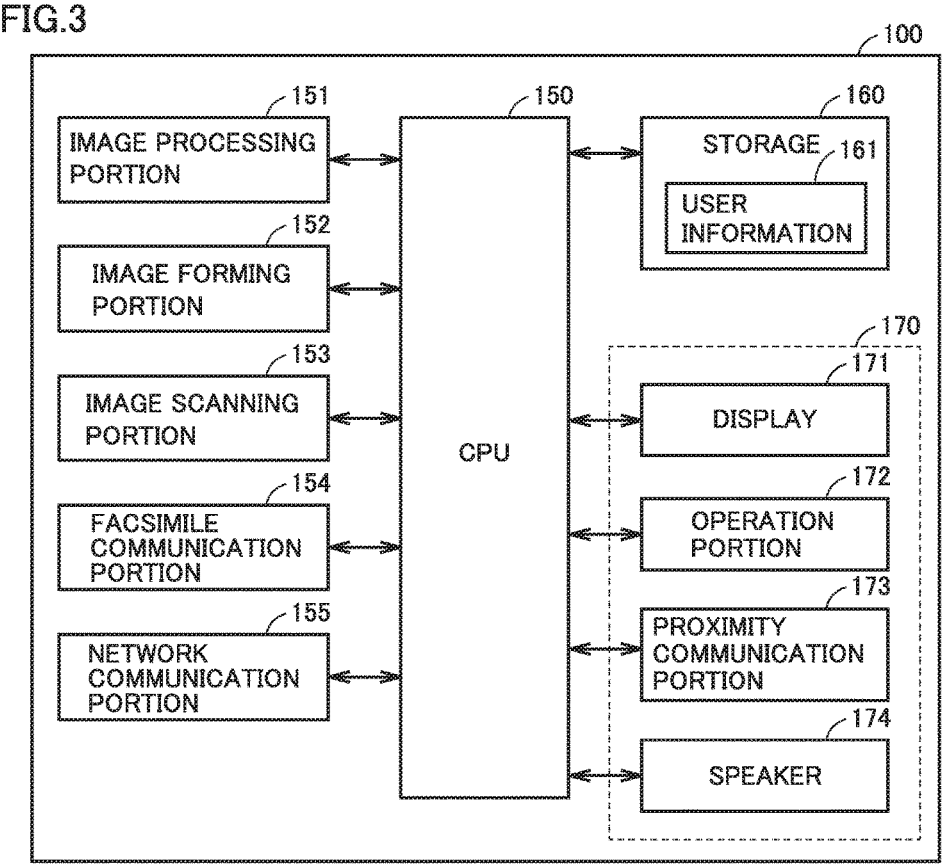
FIG. 3 is a diagram schematically showing a hardware configuration of the MFP.

FIG. 3 is a diagram schematically showing a hardware configuration of MFP 100.

Referring to FIG. 3, MFP 100 includes a central processing unit (CPU) 150 for overall control, a storage 160 which stores a program and data, and operation panel 170.

Storage 160 stores a program executed by CPU 150 and various types of data. Data stored in storage 160 includes user information 161. User information 161 defines, for example, information specifying a user who is permitted to operate (or use) MFP 100. An image of a fingerprint of a user permitted to use MFP 100 represents one example of the information specifying the user. A feature value in an image of a fingerprint of a user permitted to use MFP 100 represents another example.

Operation panel 170 includes display 171, an operation portion 172, proximity communication portion 173, and a speaker 174. A liquid crystal display represents one example of display 171. A plasma display represents another example of display 171. Operation portion 172 accepts an input of an operation onto MFP 100. Operation portion 172 includes a hardware key included in hardware key group 172A (FIG. 2) and a plurality of software keys shown on display 171. A single software key may be shown on display 171. Proximity communication portion 173 includes, for example, a circuit for establishing near field communication (NFC) under ISO/IEC 14443. Speaker 174 outputs voice and sound under the control by CPU 150.

MFP 100 further includes an image processing portion 151, an image forming portion 152, an image scanning portion 153, a facsimile communication portion 154, and a network communication portion 155. Image processing portion 151 performs various types of processing including scaling of an input image. Image forming portion 152 includes an element for forming an image on recording paper, such as a photoconductor. Image scanning portion 153 includes an element for generating image data of a document, such as a scanner. Facsimile communication portion 154 includes an element for transmitting and receiving image data through facsimile communication, such as a modem. Network communication portion 155 includes an element for communicating data through a network, such as a network card. Since functions of image processing portion 151, image forming portion 152, image scanning portion 153, facsimile communication portion 154, and network communication portion 155 have boon known well in connection with an image forming apparatus, detailed description will not be repeated here.

[Functional Configuration]

Figure 4:
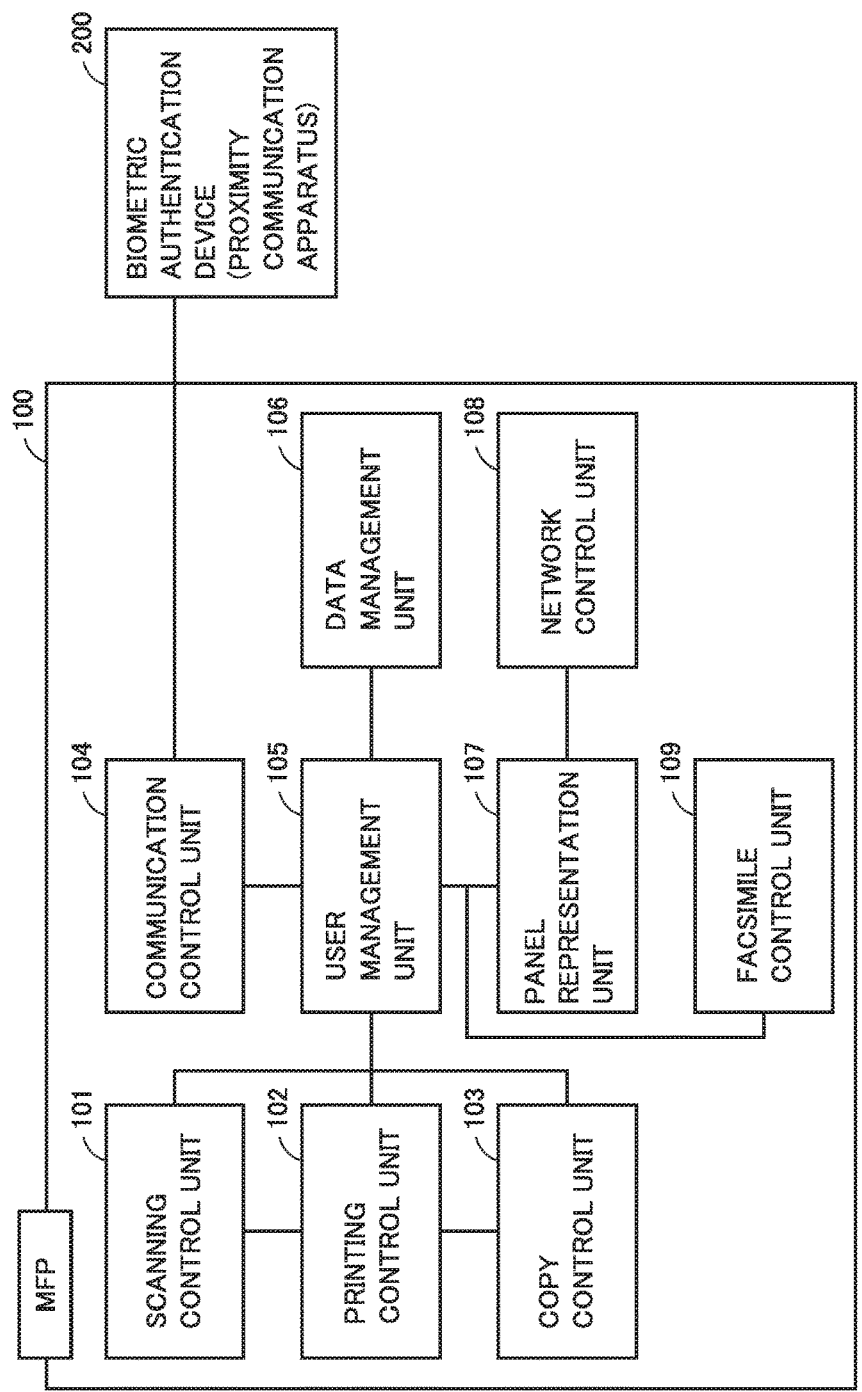
FIG. 4 is a diagram showing one example of a functional block of the MFP.

FIG. 4 is a diagram showing one example of a functional block of MFP 100. As shown in FIG. 4, MFP 100 functions as a scanning control unit 101, a printing control unit 102, a copy control unit 103, a communication control unit 104, a user management unit 105, a data management unit 106, a panel representation unit 107, a network control unit 108, and a facsimile control unit 109.

Scanning control unit 101 corresponds, for example, to CPU 150 which controls image scanning portion 153 and implements scanning of a document.

Printing control unit 102 corresponds, for example, to CPU 150 which controls image forming portion 152 and implements an image forming operation.

Copy control unit 103 corresponds, for example, to CPU 150 which controls image scanning portion 153 and image forming portion 152 and implements a copying operation in MFP 100.

Communication control unit 104 corresponds, for example, to CPU 150 which controls proximity communication portion 173 and implements proximity communication between another apparatus such as biometric authentication apparatus 200 and MFP 100.

User management unit 105 corresponds, for example, to CPU 150 which controls an operation of MFP 100 as a whole by using user information 161 (FIG. 3) and implements an operation of MFP 100 in accordance with a result of user authentication.

Data management unit 106 corresponds, for example, to CPU 150 which manages a file registered in storage 160 and manages storage of data in MFP 100.

Panel representation unit 107 corresponds, for example, to CPU 150 which controls representation (a shown content and/or a quantity of light) on display 171 and manages representation on display 171.

Network control unit 108 corresponds, for example, to CPU 150 which controls network communication portion 155 and controls communication between another apparatus and MFP 100 through a network.

Facsimile control unit 109 corresponds, for example, to CPU 150 which controls facsimile communication portion 154 and controls facsimile communication between another apparatus and MFP 100.

[Specific Example of Operation]

(Operation 1)

In one embodiment, when biometric authentication apparatus 200 is held over touch area 173A and biometric authentication apparatus 200 is optically detecting biological information while display 171 is turned on as shown in sub-figure A of FIG. 2, CPU 150 reduces a quantity of light emitted from display 171 (sub-figure B of FIG. 2).

Reduction in quantity of light may encompass a concept as below in this example and each subsequent example.

A quantity of light at only some wavelengths (a wavelength used for detection of biological information by biometric authentication apparatus 200 and a wavelength in certain relation with the wavelength (close in wavelength region)) emitted from display 171 may be reduced.

A quantity of light to be reduced is not limited to a quantity of light from display 171. When there is a key arranged in the vicinity of touch area 173A and including an LED lamp among keys belonging to hardware key group 172A, CPU 150 may reduce a quantity of light from the LED lamp (lower lightness or turn off the lamp).

(Operation 2)

In one embodiment, MFP 100 turns off display 171 in a sleep state, and when it returns from the sleep state, it turns on display 171. When biometric authentication apparatus 200 is held over touch area 173A and biometric authentication apparatus 200 is optically detecting biological information while MFP 100 returns from the sleep state, MFP 100 does not immediately turn on display 171. After detection of biological information by biometric authentication apparatus 200 ends, MFP 100 reduces a quantity of light emitted from display 171.

Figure 5:
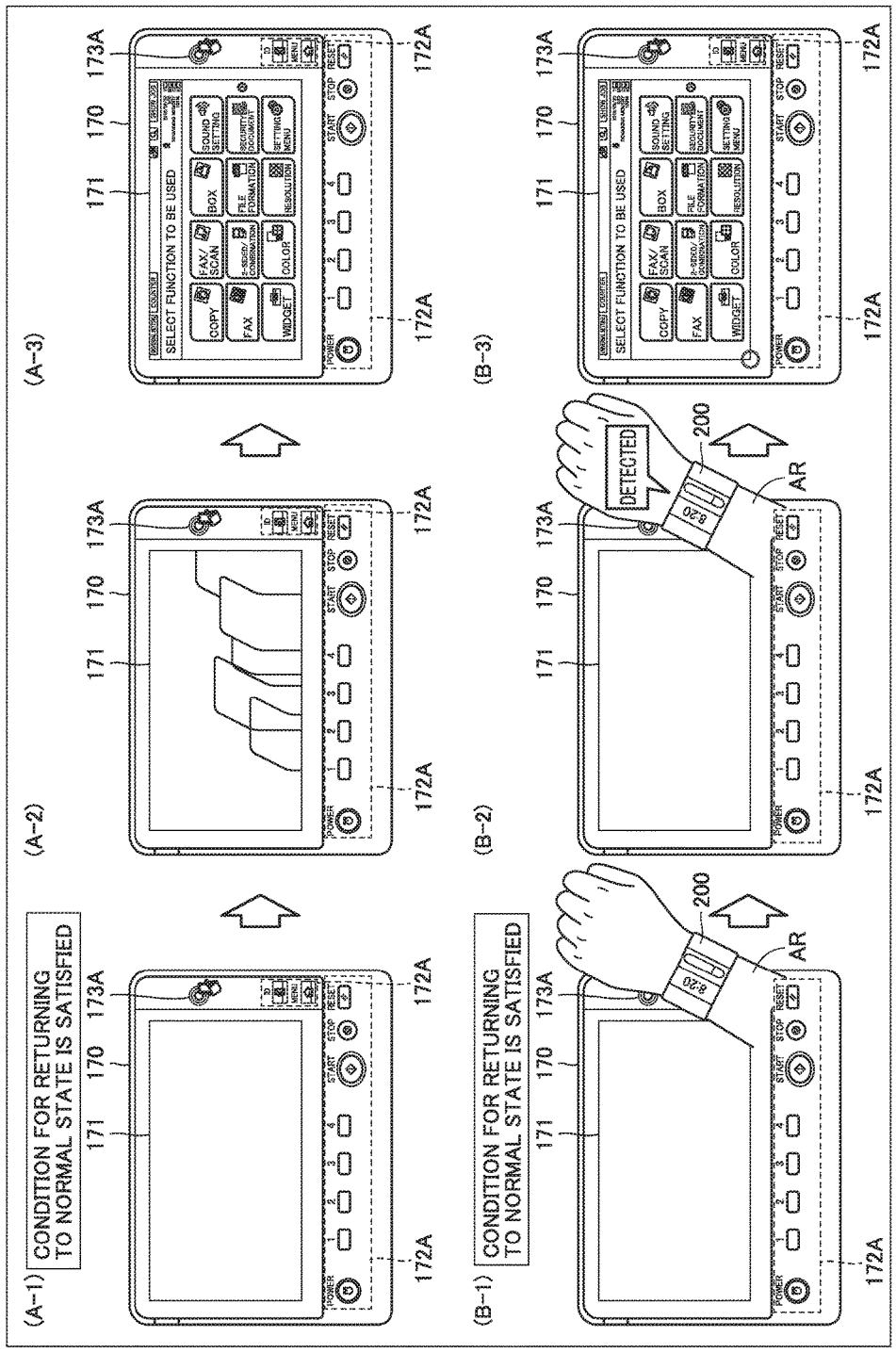
FIG. 5 is a diagram for illustrating change in manner of representation on a display when the MFP returns from a sleep state.

FIG. 5 is a diagram for illustrating change in manner of representation on display 171 when MFP 100 returns from the sleep state. In FIG. 5, sub-figures A-1, A-2, and A-3 show change with biometric authentication apparatus 200 not being held over touch area 173A while sub-figures B-1, B-2, and B-3 show change when biometric authentication apparatus 200 is held over touch area 173A.

Change in manner of representation shown in sub-figures A-1, A-2, and A-3 will initially be described. Sub-figure A-1 shows a state of display 171 in the sleep state. In the sleep state, display 171 is turned off. When a condition for return from the sleep state to a normal state is satisfied, representation on display 171 makes transition to a state shown in sub-figure A-3 through a state shown in sub-figure A-2. Start of communication with biometric authentication apparatus 200 represents one example of the condition for return to the normal state. An operation of a specific key (for example, a start key) in hardware key group 172A represents another example of the condition for return to the normal state.

In sub-figure A-2, display 171 is turned on and shows a screen showing that MFP 100 is returning to the normal state (a part of animation).

In sub-figure A-3, display 171 is turned on and shows a screen (hereinafter also referred to as an "operation screen") in which an input of an operation by a user is awaited.

Change in manner of representation shown in sub-figures B-1, B-2, and B-3 will now be described. Sub-figure B-1 shows a state of display 171 in the sleep state. In the sleep state shown in sub-figure B-1, display 171 is turned off as shown in sub-figure A-1.

In the state shown in sub-figure B-1, biometric authentication apparatus 200 attached to arm AR of a user is held over touch area 173A. In the state shown in sub-figure B-1, for example, CPU 150 instructs biometric authentication apparatus 200 to detect biological information by communicating with biometric authentication apparatus 200 through proximity communication portion 173.

As shown in sub-figure B-2, biometric authentication apparatus 200 starts detection of biological information in response to an instruction from CPU 150. Change over time from sub-figure B-1 to sub-figure B-2 corresponds to change over time from sub-figure A-1 to sub-figure A-2. Display 171 in sub-figure A-2 shows a screen showing that MFP 100 is returning to the normal state, whereas display 171 in sub-figure B-2 is turned off, because biometric authentication apparatus 200 is detecting biological information and hence CPU 150 controls display 171 such that a quantity of emitted light is smaller than in an example in which biometric authentication apparatus 200 is not detecting biological information (sub-figure A-2).

As shown in sub-figure B-3, when detection of biological information by biometric authentication apparatus 200 ends, CPU 150 has display 171 provide a representation as in the normal condition, that is, a representation in accordance with the flow shown as sub-figures A-1 to A-3. Change over time from sub-figure B-1 to sub-figure B-3 corresponds to change over time from sub-figure A-1 to sub-figure A-3. Display 171 in sub-figure B-3 thus provides a representation as in sub-figure A-3.

In the example described with reference to FIG. 5 above, normally, a series of flows of representation on display 171 is assumed (sub-figures A-1 to A-3). In such a case, when biometric authentication apparatus 200 which is communicating with proximity communication portion 173 is detecting biological information during a period in which the flow of representation is to be executed, CPU 150 controls display 171 to reduce a quantity of light it emits (sub-figure B-2).

(Operation 3)

Figure 6:
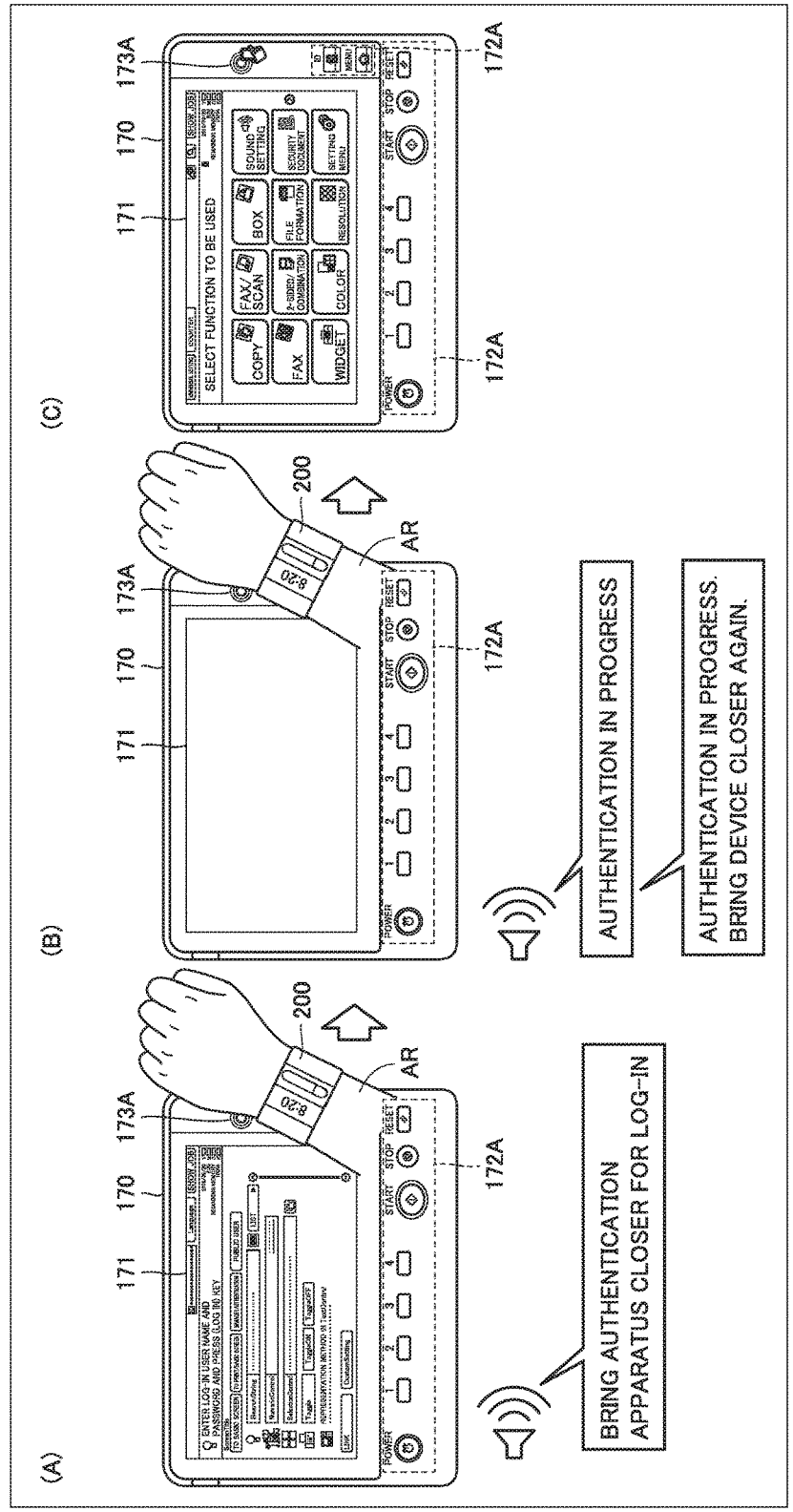
FIG. 6 is a diagram for illustrating audio guidance with reduction in quantity of light from the display.

In one embodiment, when MFP 100 reduces a quantity of light from display 171 in response to detection of biological information by biometric authentication apparatus 200, MFP 100 provides audio guidance. FIG. 6 is a diagram for illustrating audio guidance with reduction in quantity of light from display 171.

FIG. 6 includes a sub-figure A, a sub-figure B, and a sub-figure C. In one embodiment, CPU 150 instructs a user to hold biometric authentication apparatus 200 over touch area 173A in a phase in which user authentication is required. In one example, CPU 150 outputs voice "bring authentication apparatus closer for log-in" through speaker 174. Sub-figure A shows a scene in which the user brings biometric authentication apparatus 200 closer to the vicinity of touch area 173A in response to the voice.

Biometric authentication apparatus 200 starts detection of biological information as it is held over touch area 173A. In one example, CPU 150 instructs biometric authentication apparatus 200 to detect biological information and biometric authentication apparatus 200 starts detection of biological information in response to the instruction.

Sub-figure B shows a state that a quantity of light from display 171 is reduced in response to start of detection of biological information by biometric authentication apparatus 200. CPU 150 may output voice "authentication in progress" through speaker 174. The user can thus understand the reason for reduction in quantity of light from display 171 as detection of biological information by biometric authentication apparatus 200.

CPU 150 may further output voice and sound in accordance with a result of detection of biological information. For example, when an appropriate result of detection (which indicates successful authentication as a user) is not transmitted from biometric authentication apparatus 200 within a certain period of time since the instruction of detection of biological information to biometric authentication apparatus 200. CPU 150 may instruct biometric authentication apparatus 200 to detect biological information again. In this case, by outputting voice "Authentication in progress. Bring device closer again," the CPU may invite the user to continue holding biometric authentication apparatus 200 over touch area 173A.

When user authentication is completed as a result of reception of an appropriate result of detection from biometric authentication apparatus 200, CPU 150 may notify the user of completion of authentication by outputting voice "user authentication has been completed."

When user authentication is completed. CPU 150 returns a quantity of light from display 171 to an original quantity. Sub-figure C shows a state that the quantity of light from display 171 is returned to the original quantity. In FIG. 6, display 171 in sub-figure A shows a screen presented to a user before authentication, while display 171 in sub-figure C shows a screen presented to a user of which authentication has been completed.

(Operation 4)

Figure 7:
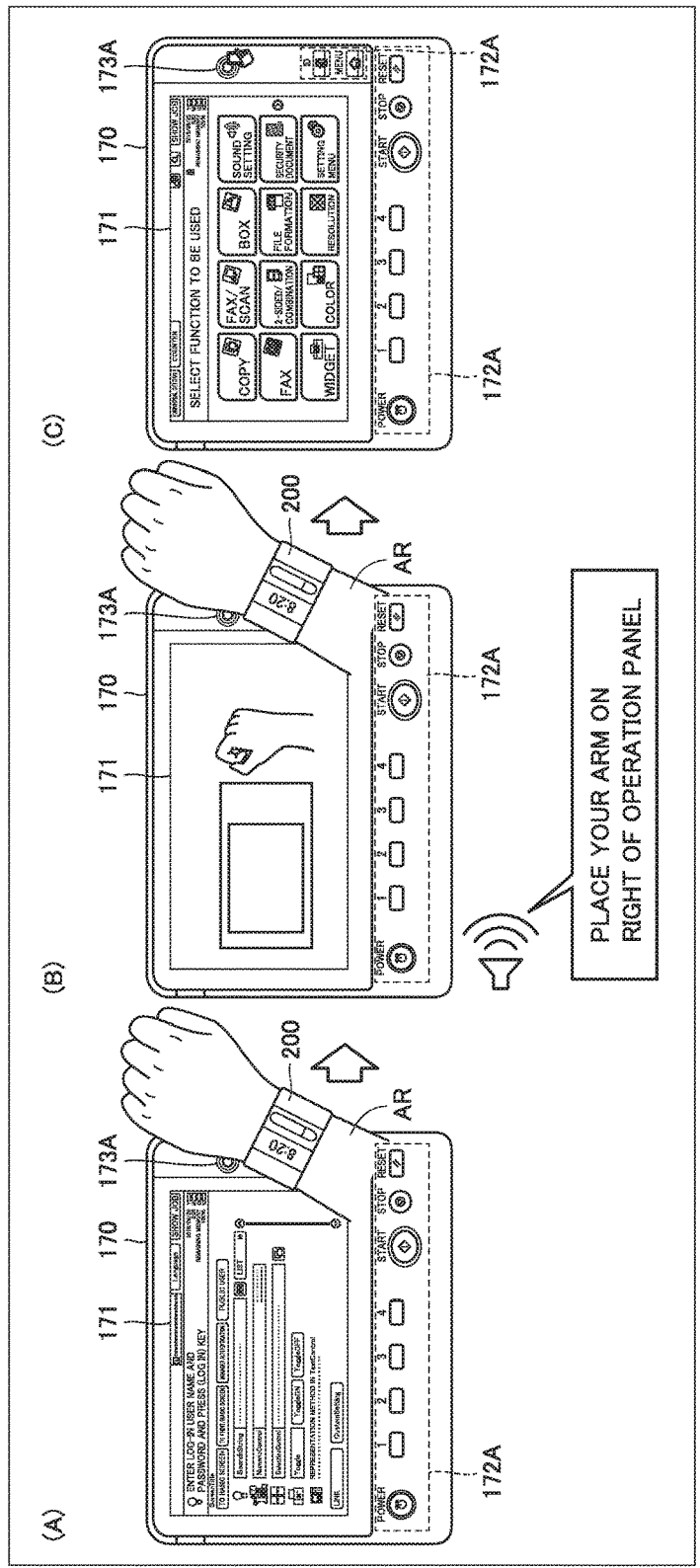
FIG. 7 is a diagram for illustrating an exemplary representation on a screen for guiding arrangement of a biometric authentication apparatus on the display.

In one embodiment, while biometric authentication apparatus 200 held over touch area 173A is detecting biological information. MFP 100 may show a screen for guiding arrangement of biometric authentication apparatus 200 on display 171. FIG. 7 is a diagram for illustrating an exemplary representation on a screen for guiding arrangement of the biometric authentication apparatus on display 171.

FIG. 7 includes a sub-figure A, a sub-figure B, and a sub-figure C. Sub-figure A shows a scene in which the user brings biometric authentication apparatus 200 closer to the vicinity of touch area 173A.

Sub-figure B shows a scene in which display 171 shows a screen for guiding arrangement of the biometric authentication apparatus in response to start of detection of biological information by biometric authentication apparatus 200. Display 171 shows a picture schematically showing the operation panel and a hand (an arm) of the user. In the picture, the hand (arm) of the user is arranged on the right of the operation panel. Looking at the picture, the user recognizes that the user is requested to arrange his/her arm to which biometric authentication apparatus 200 is attached on the right of operation panel 170. CPU 150 may further output voice "place your arm on right of operation panel" through speaker 174.

A quantity of light emitted from display 171 in sub-figure B is smaller than a quantity of light emitted from display 171 in sub-figure A. In the screen shown on display 171 in sub-figure B, the picture of the operation panel and the hand (arm) of the user is arranged relatively on the left on display 171, that is, at a position distant from touch area 173A. Thus, light emitted from display 171 reaching biometric authentication apparatus 200 located in the vicinity of touch area 173A can be avoided as much as possible.

When detection of biological information by biometric authentication apparatus 200 ends, CPU 150 returns a representation on display 171 to a normal representation as shown in sub-figure C. A quantity of light in representation on display 171 thus returns to the normal quantity of light. In FIG. 7 as well, as in FIG. 6, display 171 in sub-figure A shows a screen presented to the user before authentication, while display 171 in sub-figure C shows a screen presented to the authenticated user.

(Operation 5)

Figure 8:
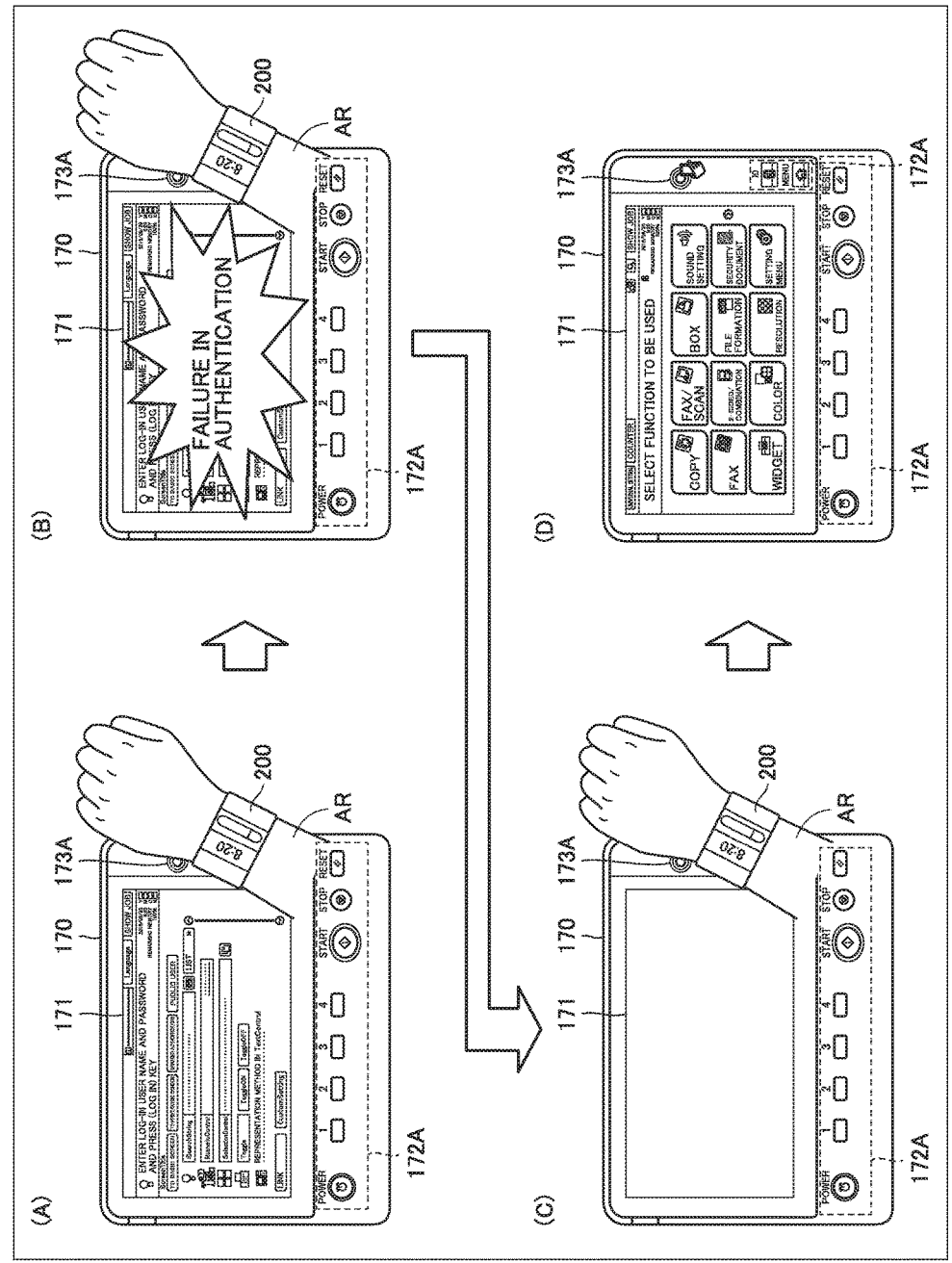
FIG. 8 is a diagram for illustrating change in manner of representation on the display of the MFP in one embodiment.

CPU 150 may reduce a quantity of light from display 171 when it instructs biometric authentication apparatus 200 to detect biological information for the first time as described with reference to sub-figure B of FIG. 7. CPU 150 may maintain the representation on display 171 as shown in sub-figure A of FIG. 7 without reducing the quantity of light when it instructs biometric authentication apparatus 200 to detect biological information for the first time, and may reduce the quantity of light on condition of failure in detection of biological information by biometric authentication apparatus 200. FIG. 8 is a diagram for illustrating change in manner of representation on display 171 of MFP 100 in one embodiment.

FIG. 8 includes a sub-figure A, a sub-figure B, a sub-figure C. and a sub-figure D. Sub-figure A shows a scene in which the user brings biometric authentication apparatus 200 closer to the vicinity of touch area 173A. In the example in FIG. 8, CPU 150 maintains the representation (quantity of light) on display 171 until it is notified of failure in detection of biological information by biometric authentication apparatus 200.

Sub-figure B shows a scene in which after biometric authentication apparatus 200 starts detection of biological information, biometric authentication apparatus 200 notifies MFP 100 of failure in detection of biological information CPU 150 reduces a quantity of light emitted from display 171 in response to reception of a notification about failure in detection of biological information from biometric authentication apparatus 200.

Sub-figure C shows a scene in which the quantity of light from display 171 is reduced from the state shown in sub-figure A. In sub-figure C, display 171 is turned off by way of example of reduction in quantity of light.

Thereafter, when CPU 150 is notified of end of detection of biological information by biometric authentication apparatus 200, the CPU returns the quantity of light from display 171 to the original quantity. Display 171 thus resumes the representation as shown in sub-figure C. In FIG. 8 as well, as in FIG. 6, display 171 in sub-figure A shows a screen presented to the user before authentication, while display 171 in sub-figure D shows a screen presented to the authenticated user.

Absence of transmission of an appropriate result of detection from biometric authentication apparatus 200 represents one example of failure in detection of biological information. A result of detection transmitted from biometric authentication apparatus 200 including at least a prescribed amount of noise represents another example of failure in detection of biological information. Transmission of information indicating failure in detection of biological information from biometric authentication apparatus 200 represents yet another example of failure in detection of biological information.

(Operation 6)

Figure 9:
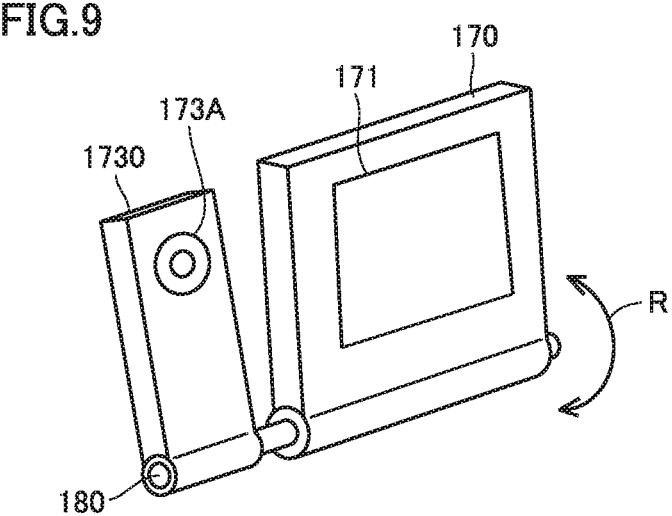
FIG. 9 is a diagram showing a modification of a configuration in the vicinity of the operation panel of the MFP.

In one embodiment, MFP 100 may have touch area 173A and proximity communication portion 173 mounted on a member independent of operation panel 170. FIG. 9 is a diagram showing a modification of a configuration in the vicinity of operation panel 170 in MFP 100.

Figure 10:
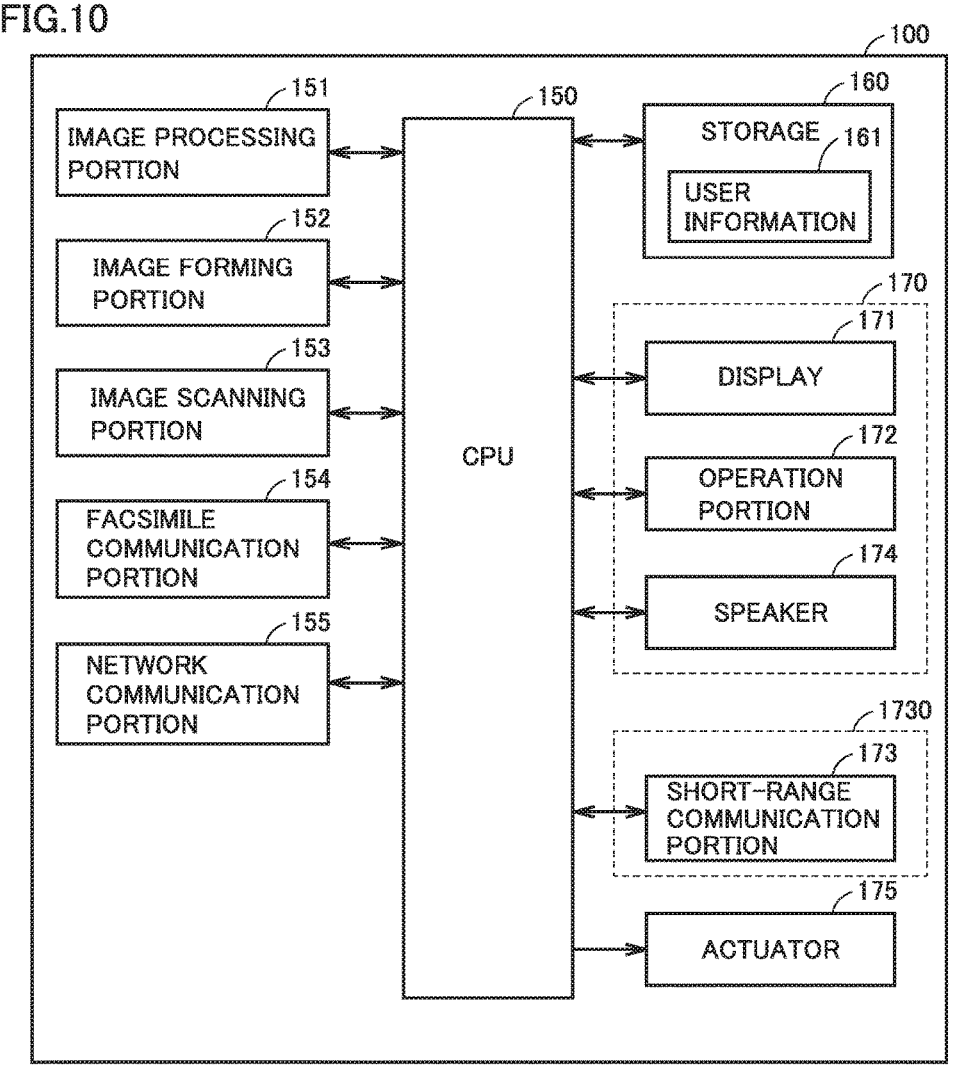
FIG. 10 is a diagram showing a hardware configuration of the MFP in accordance with the example in FIG. 9.

As shown in FIG. 9, MFP 100 includes an authentication unit 1730 distant from operation panel 170. Operation panel 170 and authentication unit 1730 are supported on a shaft 180. Touch area 173A is provided on a surface of authentication unit 1730. FIG. 10 is a diagram showing a hardware configuration of MFP 100 in accordance with the example in FIG. 9.

As shown in FIG. 10, authentication unit 1730 contains proximity communication portion 173. In the example in FIG. 10. MFP 100 further includes an actuator 175 which pivots operation panel 170 in a direction shown with an arrow R in FIG. 9. In the example shown in FIGS. 9 and 10, positions of authentication unit 1730 and operation panel 170 relative to each other should only be changed. Instead of or in addition to pivot of operation panel 170, authentication unit 1730 may be pivoted. A manner of change in relative position is not limited to pivot.

Figure 11:
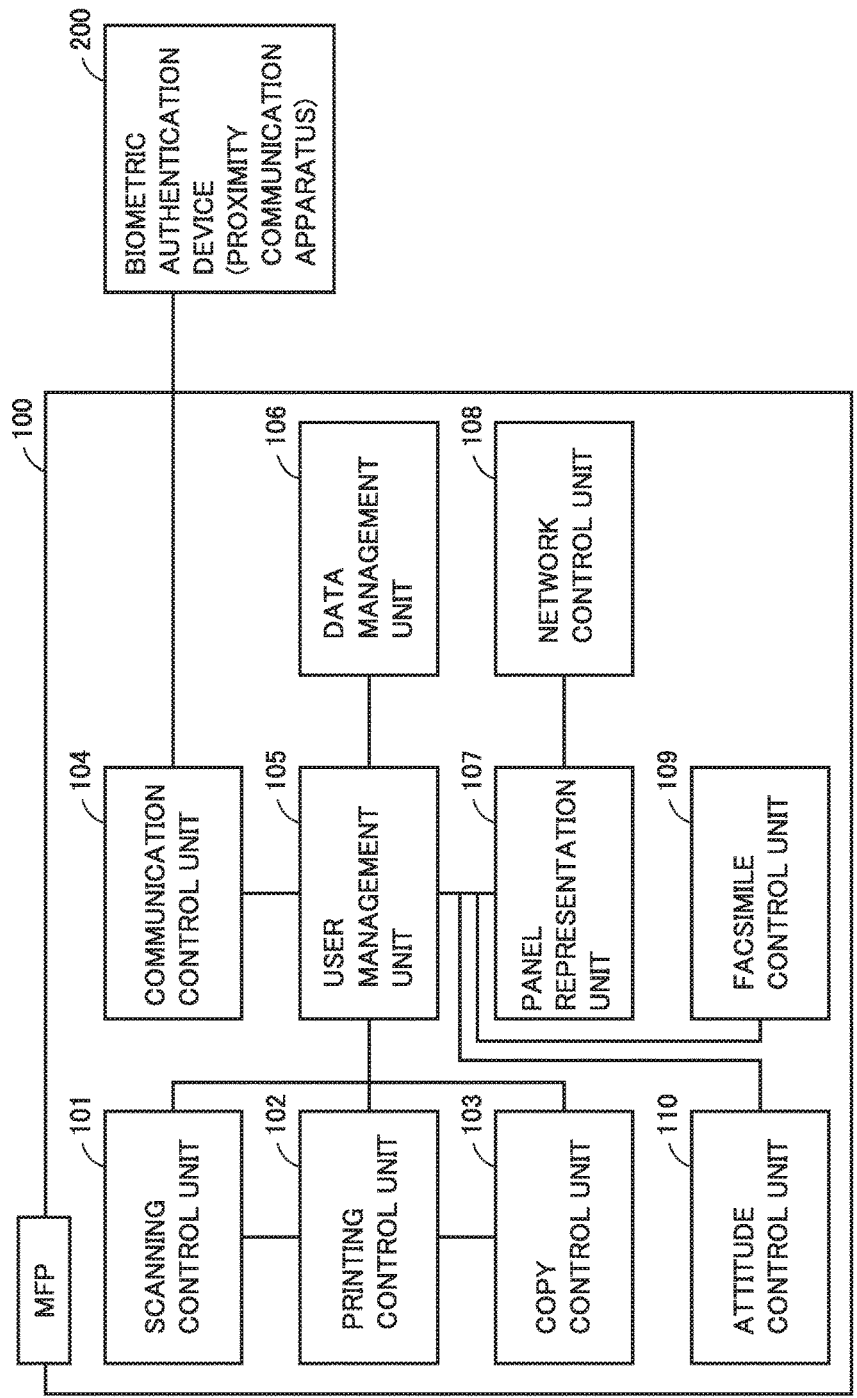
FIG. 11 is a functional block diagram of the MFP in accordance with the example in FIG. 9.

FIG. 11 is a functional block diagram of MFP 100 in accordance with the example in FIG. 9. As shown in FIG. 11, MFP 100 further includes an attitude control unit 110 in addition to the example shown in FIG. 4. Attitude control unit 110 has a function to control relative positional relation between authentication unit 1730 and operation panel 170 and is implemented by CPU 150 and actuator 175.

Figure 12:
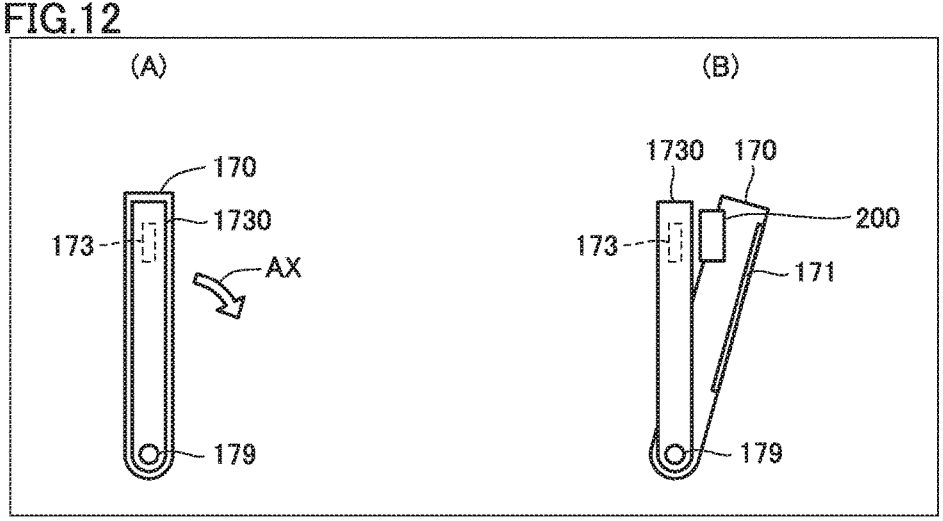
FIG. 12 is a diagram for illustrating one example of change in relative positional relation between an authentication unit and the operation panel in FIG. 9.

FIG. 12 is a diagram for illustrating one example of change in relative positional relation between authentication unit 1730 and operation panel 170 in FIG. 9. A sub-figure A and a sub-figure B of FIG. 12 show operation panel 170 and authentication unit 1730 viewed from the left.

In FIG. 12, sub-figure A shows a state that biometric authentication apparatus 200 which is detecting biological information is not held over touch area 173A. In this state, a front surface of operation panel 170 faces substantially the same direction as a front surface of authentication unit 1730. In sub-figure A, authentication unit 1730 and operation panel 170 are thus shown as being substantially superimposed on each other.

Sub-figure B shows a state that biometric authentication apparatus 200 which is detecting biological information is not held over touch area 173A. In this state, operation panel 170 is pivoted in a direction shown with an arrow AX with respect to the state shown in sub-figure A. Thus, in sub-figure B, operation panel 170 is arranged at such a position (in such an orientation) that light emitted from display 171 is less likely to reach biometric authentication apparatus 200 held over touch area 173A.

Figure 13:
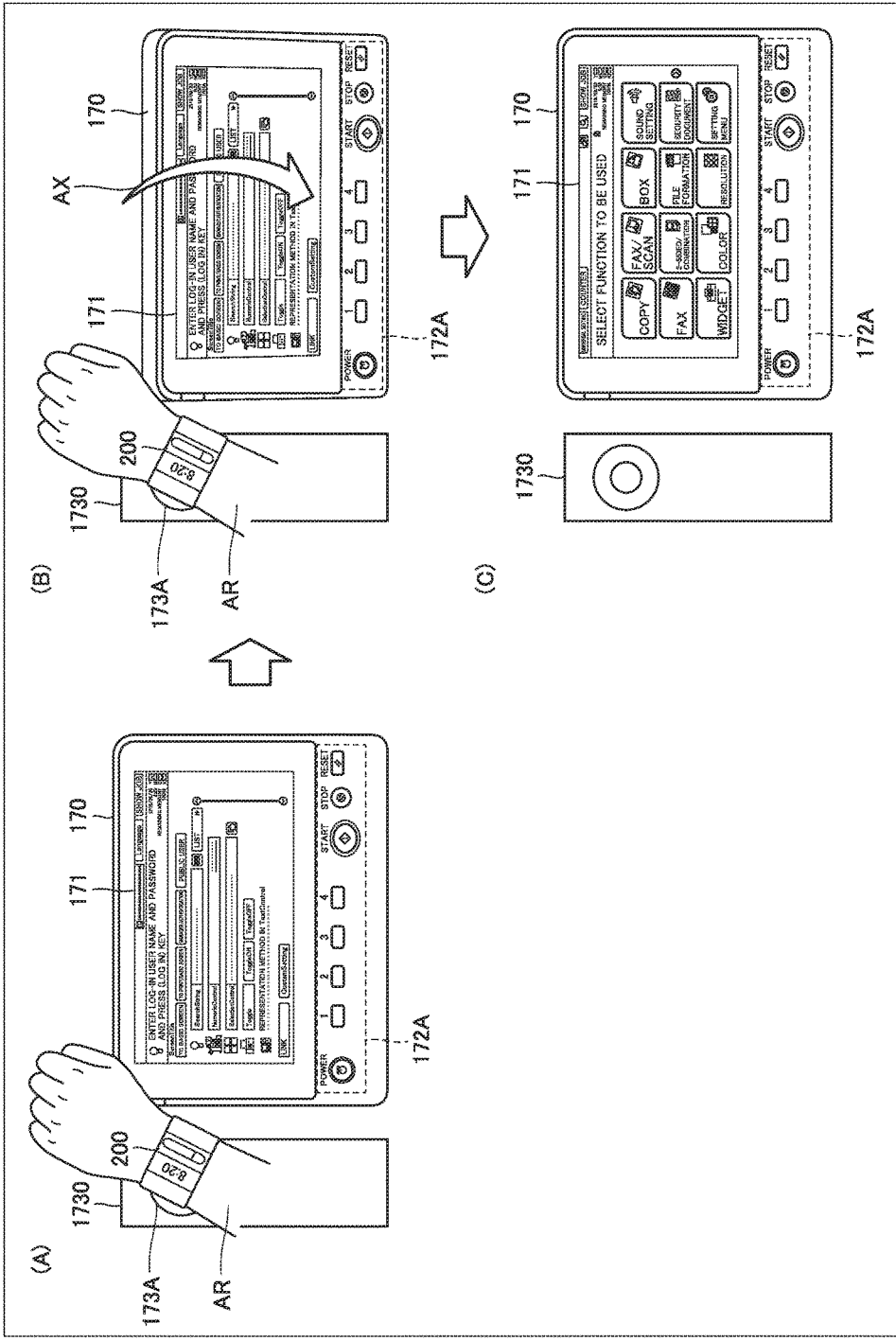
FIG. 13 is a diagram for illustrating a flow of change in positional relation between the authentication unit and the operation panel in the MFP in accordance with the example in FIG. 9.

FIG. 13 is a diagram for illustrating a flow of change in positional relation between authentication unit 1730 and operation panel 170 in MFP 100 in accordance with the example in FIG. 9. FIG. 13 includes a sub-figure A, a sub-figure B, and a sub-figure C. Sub-figure A shows a scene in which a user brings biometric authentication apparatus 200 closer to the vicinity of touch area 173A of authentication unit 1730.

Sub-figure B of FIG. 13 shows a state that a position of operation panel 170 is pivoted as shown in sub-figure B of FIG. 12 in response to start of detection of biological information by biometric authentication apparatus 200. A state of operation panel 170 in sub-figure B of FIG. 13 corresponds to the state shown in sub-figure B of FIG. 12. Arrow AX shown in sub-figure B of FIG. 13 corresponds to arrow AX shown in sub-figure A of FIG. 12.

A quantity of light emitted from display 171 in sub-figure B may be smaller than a quantity of light emitted from display 171 in sub-figure A. CPU 150 may pivot operation panel 170 as described with reference to sub-figure B when it instructs biometric authentication apparatus 200 to detect biological information for the first time. CPU 150 may have operation panel 170 held at a pivoted position shown in sub-figure A without pivoting operation panel 170 when it instructs biometric authentication apparatus 200 to detect biological information for the first time and may pivot operation panel 170 as shown in sub-figure B on condition of failure in detection of biological information by biometric authentication apparatus 200.

When detection of biological information by biometric authentication apparatus 200 ends, CPU 150 returns a position of operation panel 170 to the original position (the position as shown in A) as shown in sub-figure C of FIG. 13. CPU 150 returns the quantity of light back to the normal quantity of light if it has reduced the quantity of light in representation on display 171. In FIG. 13 as well, as in FIG. 6, display 171 in sub-figure A shows a screen presented to the user before authentication, while display 171 in sub-figure C shows a screen presented to the authenticated user.

[Flow of Process]

FIGS. 14 to 18 are flowcharts showing a flow of a process performed for authenticating a user and having the user log in MFP 100. CPU 150 performs the process shown in FIGS. 14 to 18, for example, by executing a program stored in storage 160. Processing contents will be described below.

Figure 14:
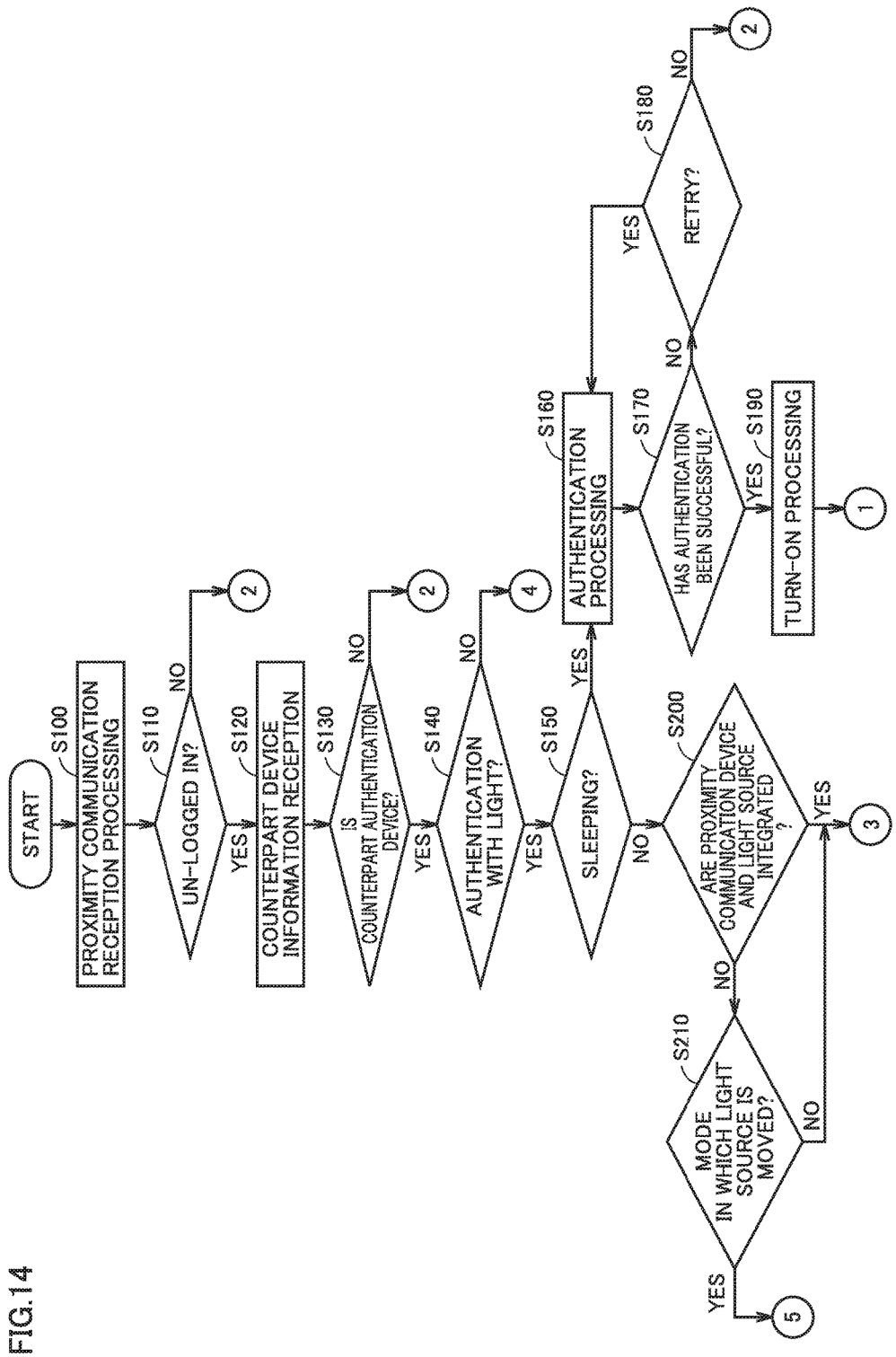
FIGS. 14 to 18 are flowcharts representing a flow of a process performed for authenticating a user and having the user log in the MFP.

Initially, referring to FIG. 14, in step S100, CPU 150 performs processing for starting communication with an external apparatus through proximity communication portion 173. When connection with an external apparatus is established, the process proceeds to step S110. CPU 150 may obtain in step S100 information specifying a user of the external apparatus. A user ID represents one example of information specifying a user.

In step S110, CPU 150 determines whether or not a user of the external apparatus with which connection has been established in step S100 is in a state "un-logged in" MFP 100. When CPU 150 determines that the user is in the "un-logged in" state (YES in step S110), the process proceeds to step S120. When CPU 150 determines that the user is not in the "un-logged in" state (that is, has logged in) (NO in step S110), the CPU quits the process in FIGS. 14 to 18.

In step S120, CPU 150 receives information on the external apparatus (a counterpart device) with which connection has been established in step S100. CPU 150 may receive the information from the external apparatus itself or from a server.

In step S130, CPU 150 determines whether or not the external apparatus with which connection has been established in step S100 is a device (an authentication device) which provides information for authentication of a user. When CPU 150 determines that the external apparatus is the authentication device (YES in step S130), the process proceeds to step S140. When CPU 150 determines that the external apparatus is not the authentication device (NO in step S130), the CPU quits the process in FIGS. 14 to 18.

Figure 18:
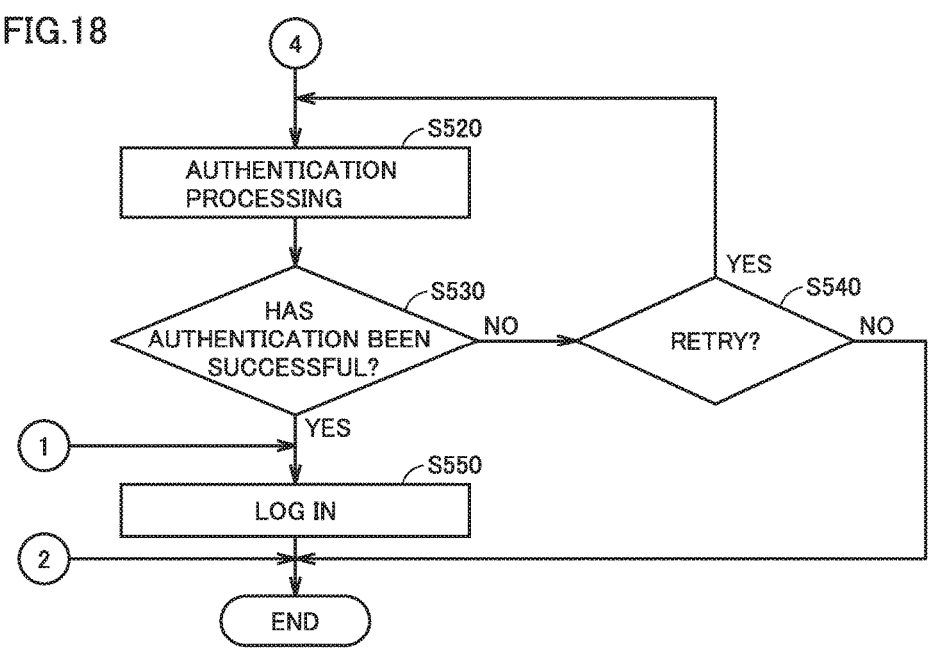

CPU 150 determines in step S140 whether or not the external apparatus with which connection has been established in step S100 is an authentication device which detects information for authentication of a user with light. When the external apparatus with which connection has been established in step S100 is, for example, an apparatus which detects biological information with light like biometric authentication apparatus 200, CPU 150 determines that the external apparatus is the authentication device which detects information for authentication of a user with light. When CPU 150 determines that the external apparatus is the authentication device which detects information for authentication of the user with light (YES in step S140), the process proceeds to step S150, and otherwise (NO in step S140), the process proceeds to step S520 (FIG. 18).

CPU 150 determines in step S150 whether or not MFP 100 is in the sleep state. The sleep state refers, for example, to a state that an amount of power consumption by MFP 100 is reduced by reducing charging power of a photoconductor during a period in which MFP 100 is not performing an operation for forming an image. When CPU 150 determines that MFP 100 is in the sleep state (YES in step S150), the process proceeds to step S160. When CPU 150 determines that MFP 100 is not in the sleep state (NO in step S150), the process proceeds to step S200.

Figure 19:
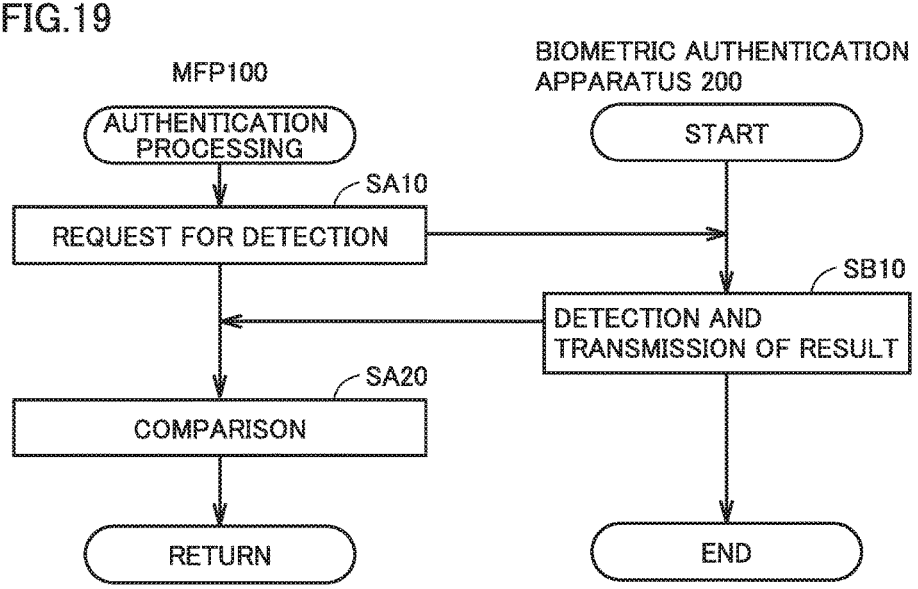
FIG. 19 is a flowchart of a sub routine of authentication processing.

In step S160, CPU 150 performs authentication processing. FIG. 19 is a flowchart of a sub routine of authentication processing in step S160. FIG. 19 shows also processing on a side of biometric authentication apparatus 200 in addition to processing on a side of MFP 100 in step S160. In FIG. 19, the flowchart on the left shows processing on the side of MFP 100, while the flowchart on the right shows processing on the side of biometric authentication apparatus 200.

Referring to FIG. 19, in step SA10 in the flowchart on the left, CPU 150 requests of biometric authentication apparatus 200 (one example of the external apparatus with which MFP 100 has established connection in step S100) for detection of biological information to be used for user authentication. An image of a fingerprint represents one example of biological information to be used for user authentication. An image of a luster represents another example.

In response to a request for detection of biological information from MFP 100, in step SB10, biometric authentication apparatus 200 detects biological information and transmits a result of detection to MFP 100. Image data of a detected fingerprint (and/or a luster) represents one example of a result to be transmitted. Feature data obtained from image data of a detected fingerprint (and/or a luster) represents another example.

In step SA20. CPU 150 compares the result of detection transmitted from biometric authentication apparatus 200 with data stored as user information 161 (FIG. 3). Thereafter, the process returns to the authentication processing in step S160 in FIG. 14.

Referring back to FIG. 14, after CPU 150 performs authentication processing in step S160, the CPU determines in step S170 whether or not a user has successfully been authenticated based on a result of comparison in step S160 (step SA20 in FIG. 19).

For example, when a matching score between the result transmitted from biometric authentication apparatus 200 and data of user information 161 is equal to or higher than a predetermined level (for example, 99% or higher), CPU 150 determines that the user has successfully been authenticated, and when the matching score is lower than the predetermined level (for example, less than 99%), the CPU determines that user authentication has failed.

When CPU 150 determines that the user has successfully been authenticated (YES in step S170), the process proceeds to step S190. When CPU 150 determines that user authentication has failed (NO in step S170), the process proceeds to step S180.

CPU 150 determines in step S180 whether or not a condition for retry of user authentication has been satisfied. In MFP 100, for example, the upper limit for the number of times of retry of user authentication is set. When the number of times of authentication processing performed in step S160 has not yet reached the upper limit, CPU 150 determines that a condition for retry is satisfied, and when the number of times of authentication processing performed has already reached the upper limit, it determines that a condition for retry is not satisfied. When CPU 150 determines that a condition for retry has been satisfied (YES in step S180), the process returns to step S160. When CPU 150 determines that the condition for retry is not satisfied (NO in step S180), the CPU quits the process in FIGS. 14 to 18.

In step S190, CPU 150 turns on display 171. Display 171 thus shows the operation screen as shown in sub-figure B-3 of FIG. 5. Thereafter, the process proceeds to step S550 (FIG. 18).

Control in step S150 to step S190 corresponds to control described with reference to sub-figure B-1 to sub-figure B-3 of FIG. 5.

Figure 15:
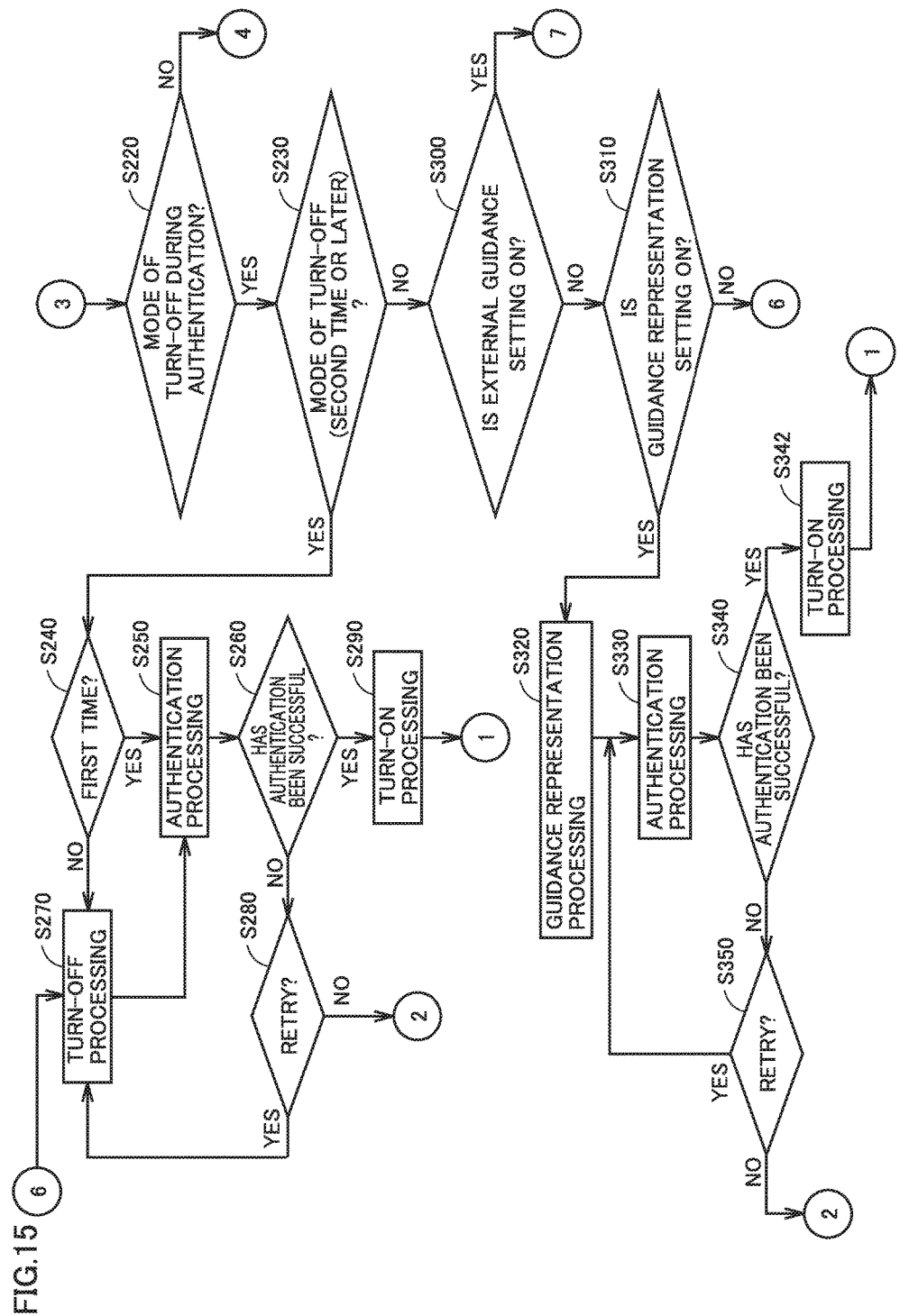

CPU 150 determines in step S200 whether or not a proximity communication device (proximity communication portion 173 in FIG. 3) and a light source (display 171) are integrally constructed in MFP 100. The construction of operation panel 170 shown in FIG. 2 represents one example of a construction in which a proximity communication device and a light source are integrally constructed. The construction of operation panel 170 and authentication unit 1730 shown in FIG. 9 represents one example of a construction in which a proximity communication device and a light source are not integrally constructed. When CPU 150 determines that the proximity communication device and the light source are integrally constructed (YES in step S200), the process proceeds to step S220 (FIG. 15). When CPU 150 determines that the proximity communication device and the light source are not integrally constructed (NO in step S200), the process proceeds to step S210.

In one example, information showing whether or not a proximity communication device and a light source are integrally constructed in MFP 100 is stored in storage 160. CPU 150 makes determination in step S200 based on that information.

In another example, a content of the processing shown in FIG. 14 is changed depending on whether or not a proximity communication device and a light source are integrally constructed in MFP 100. More specifically, when a proximity communication device and a light source are integrally constructed in MFP 100, step S200 and step S210 are not performed. In this case, when determination as NO is made in step S150, the process directly proceeds to step S220 (FIG. 15). When a proximity communication device and a light source are not integrally constructed in MFP 100, step S200 is not performed. In this case, when determination as NO is made in step S150, the process directly proceeds to step S210.

CPU 150 determines in step S210 whether or not MFP 100 has been set to a mode in which a light source is moved during detection of biological information by biometric authentication apparatus 200.

Figure 16:
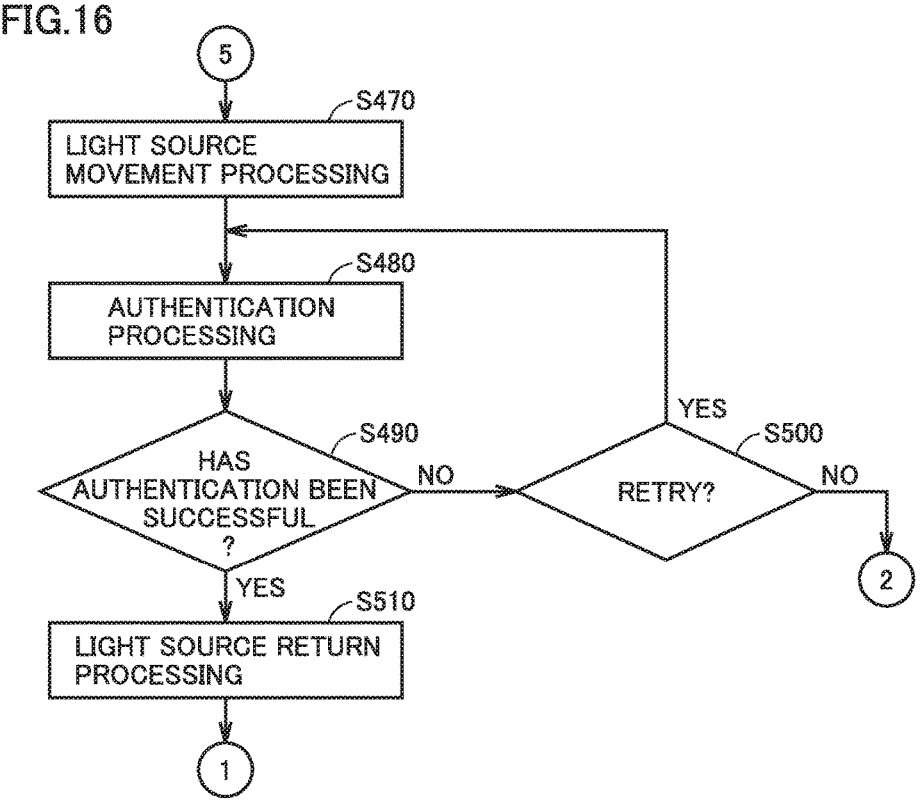

For example, MFP 100 accepts mode setting as to whether or not to pivot operation panel 170 (FIGS. 12 and 13) while biometric authentication apparatus 200 is detecting biological information. In the description below, a mode in which operation panel 170 is pivoted during detection of biological information by biometric authentication apparatus 200 is called a "pivot mode" and a mode in which operation panel 170 is not pivoted during detection is called a "non-pivot mode." Information designating which of the "pivot mode" and the "non-pivot mode" is set in connection with pivot of operation panel 170 is stored, for example, in storage 160. When CPU 150 determines that MFP 100 has been set to the "pivot mode" (YES in step S210), the process proceeds to step S470 (FIG. 16). When CPU 150 determines that MFP 100 has been set to the "non-pivot mode" (NO in step S210), the process proceeds to step S220 (FIG. 15).

Referring to FIG. 15, CPU 150 determines in step S220 whether or not MFP 100 has been set to a mode of turn-off (reduction in quantity of light from display 171) during user authentication (detection of biological information by biometric authentication apparatus 200).

Whether or not to set MFP 100 to that mode is selected, for example, by a user, and a result of selection is stored, for example, in storage 160. In the description below, a mode in which a quantity of light from display 171 is not reduced even during detection of biological information by biometric authentication apparatus 200 is called a "non-turn-off mode." A mode in which a quantity of light from display 171 is reduced from the time of first detection of biological information by biometric authentication apparatus 200 is called a "turn-off mode (first time)." A mode in which a quantity of light from display 171 is not reduced during first detection of biological information by biometric authentication apparatus 200 but a quantity of light from display 171 is reduced from the time of second detection or later of biological information is called a "turn-off mode (second time or later)."

When CPU 150 determines that MFP 100 has been set to the "turn-off mode (first time)" or the "turn-off mode (second time or later)" (YES in step S220), the process proceeds to step S230. When CPU 150 determines that MFP 100 has been set to the "non-turn-off mode" (NO in step S220), the process proceeds to step S520 (FIG. 18).

CPU 150 determines in step S230 whether or not a mode to which MFP 100 has been set is the "turn-off mode (second time or later)." When CPU 150 determines that the mode to which MFP 100 has been set is the "turn-off mode (second time or later)" (YES in step S230), the process proceeds to step S240. When CPU 150 determines that the mode to which MFP 100 has been set is the "turn-off mode (first time)" (NO in step S230), the process proceeds to step S300.

CPU 150 determines in step S240 whether or not next authentication processing (step S250) is performed for the first time. When CPU 150 determines that next authentication processing (step S250) is performed for the first time (YES in step S240), the process proceeds to step S250. When CPU 150 determines that next authentication processing (step S250) is performed for the second time or later (NO in step S240), that is, when the authentication processing (step S250) has already been performed, the process proceeds to step S270.

In step S270, CPU 150 reduces a quantity of light emitted from display 171 as described with reference to FIG. 2 as turn-off processing. Thereafter, the process proceeds to step S250.

In step S250, CPU 150 performs the authentication processing described with reference to FIG. 19. Thereafter, the process proceeds to step S260.

CPU 150 determines in step S260 whether or not a user has successfully been authenticated based on a result of comparison in step S260 (step SA20 in FIG. 19). When CPU 150 determines that the user has successfully been authenticated (YES in step S260), the process proceeds to step S290. When CPU 150 determines that user authentication has failed (NO in step S260), the process proceeds to step S280.

CPU 150 determines in step S280 whether or not a condition for retry of user authentication has been satisfied. When CPU 150 determines that a condition for retry has been satisfied (YES in step S280), the process proceeds to step S270. Thus, when a quantity of light from display 171 has not yet been reduced, the quantity of light is reduced in step S270. CPU 150 may output voice and sound as described with reference to FIG. 6 while it reduces the quantity of light. When CPU 150 determines that a condition for retry is not satisfied (NO in step S280), the CPU quits the process in FIGS. 14 to 18.

If CPU 150 has reduced a quantity of light from display 171, it returns a quantity of light from display 171 to the original quantity in step S290. Thereafter, the process proceeds to step S550 (FIG. 18).

Control in step S240 to step S290 includes control for reducing a quantity of light from display 171 on condition that MFP 100 has failed in user authentication at least once as described with reference to FIG. 8. In the state shown in sub-figure C of FIG. 8, CPU 150 may output audio guidance as described with reference to sub-figure B of FIG. 6. In the state shown in sub-figure C of FIG. 8, CPU 150 may have display 171 show guidance as shown in sub-figure B of FIG. 7.

If CPU 150 has reduced the quantity of light from display 171, the CPU determines in step S300 whether or not MFP 100 has been set to provide guidance through representation and/or voice and sound in an external apparatus. In one example, a user can switch on and off setting in MFP 100 instructing an external apparatus with which the MFP can communicate through network communication portion 155 (FIG. 3) to provide guidance while a quantity of light from display 171 is reduced. In the description below, such setting is called "external guidance setting." Information representing ON/OFF of external guidance setting is stored in storage 160.

Figure 17:
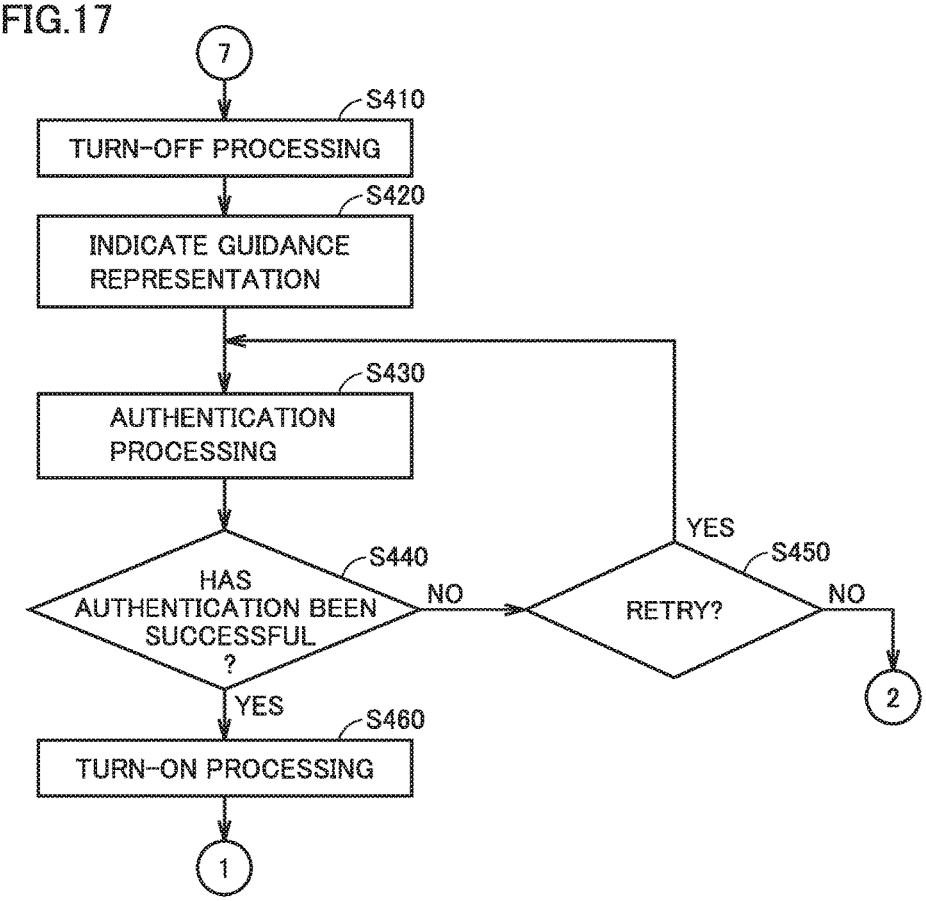

When "external guidance setting" is ON (YES in stop S300), the process proceeds to step S410 (FIG. 17). When "external guidance setting" is OFF (NO in step S300), the process proceeds to step S310.

If CPU 150 has reduced a quantity of light from display 171, the CPU determines in step S310 whether or not MFP 100 has been set to show a guidance screen on display 171. In one example, a user can switch on and off setting indicating whether or not to show a guidance screen on display 171 while a quantity of light from display 171 is reduced. In the description below, such setting is called "guidance representation setting." Information representing ON/OFF of guidance representation setting is stored in storage 160.

When "guidance representation setting" is ON (YES in step S310), the process proceeds to step S320. When "guidance representation setting" is OFF (NO in step S310), the process proceeds to step S270.

In step S320, CPU 150 has a guidance screen shown while the CPU reduces a quantity of light emitted from display 171 as guidance representation processing as described with reference to sub-figure B of FIG. 7. Thereafter, the process proceeds to step S330.

In step S330, CPU 150 performs the authentication processing described with reference to FIG. 19. Thereafter, the process proceeds to step S340.

CPU 150 determines in step S340 whether or not a user has successfully been authenticated based on a result of comparison in step S330 (step SA20 in FIG. 19). When CPU 150 determines that the user has successfully been authenticated (YES in step S340), the process proceeds to step S342. When CPU 150 determines that user authentication has failed (NO in step S340), the process proceeds to step S350.

CPU 150 determines in step S350 whether or not a condition for retry of user authentication has been satisfied. When CPU 150 determines that the condition for retry has been satisfied (YES in step S350), the process returns to step S330. When CPU 150 determines that the condition for retry is not satisfied (NO in step S350), the CPU quits the process in FIGS. 14 to 18.

In step S342, CPU 150 returns representation on display 171 to the original representation (sub-figure C of FIG. 7). Thereafter, the process proceeds to step S550 (FIG. 18).

Control in step S320 to step S350 includes control for showing guidance as described with reference to FIG. 7.

Referring to FIG. 16, in step S470, CPU 150 performs light source movement processing. In light source movement processing, for example, CPU 150 displaces operation panel 170 to the state shown in sub-figure B of FIG. 12 by driving actuator 175 (FIG. 10).

In step S480, CPU 150 performs the authentication processing described with reference to FIG. 19. Thereafter, the process proceeds to step S490.

CPU 150 determines in step S490) whether or not a user has successfully been authenticated based on a result of comparison in step S480 (step SA20 in FIG. 19). When CPU 150 determines that the user has successfully been authenticated (YES in step S490), the process proceeds to step S510. When CPU 150 determines that user authentication has failed (NO in step S490), the process proceeds to step S500.

CPU 150 determines in step S500 whether or not a condition for retry of user authentication has been satisfied. When CPU 150 determines that the condition for retry has been satisfied (YES in step S500), the process returns to step S480. When CPU 150 determines that the condition for retry is not satisfied (NO in step S500), the CPU quits the process in FIGS. 14 to 18.

In step S510. CPU 150 returns a position of operation panel 170 to the position shown in sub-figure A of FIG. 12. Thereafter, the process proceeds to step S550 (FIG. 18).

Control in step S470 to step S510 includes control for pivoting operation panel 170 as described with reference to FIGS. 12 and 13. In the state shown in sub-figure B of FIG. 12 and sub-figure B of FIG. 13. CPU 150 may reduce a quantity of light from display 171. In the state shown in sub-figure B of FIG. 12 and sub-figure B of FIG. 13, CPU 150 may output audio guidance as described with reference to sub-figure B of FIG. 6. In the state shown in sub-figure B of FIG. 12 and sub-figure B of FIG. 13, CPU 150 may have display 171 show guidance as shown in sub-figure B of FIG. 7.

Referring to FIG. 17, in step S410, CPU 150 reduces a quantity of light emitted from display 171 as turn-off processing as described with reference to FIG. 2. Thereafter, the process proceeds to step S420.

In step S420, CPU 150 instructs another apparatus to provide guidance through network communication portion 155. In one example, CPU 150 instructs another apparatus to show a screen as shown on display 171 in sub-figure B of FIG. 7. In another example, CPU 150 instructs another apparatus to output voice and sound as described with reference to sub-figure B of FIG. 6. In yet another example, CPU 150 instructs another apparatus to show the screen and output the voice and sound. In response, another apparatus shows the screen and/or outputs the voice and sound.

In step S430, CPU 150 performs the authentication processing described with reference to FIG. 19. Thereafter, the process proceeds to step S440.

CPU 150 determines in step S440 whether or not a user has successfully been authenticated based on a result of comparison in step S430 (step SA20 in FIG. 19). When CPU 150 determines that a user has successfully been authenticated (YES in step S440), the process proceeds to step S460.

When CPU 150 determines that user authentication has failed (NO in step S440), the process proceeds to step S450.

CPU 150 determines in step S450 whether or not a condition for retry of user authentication has been satisfied. When CPU 150 determines that the condition for retry has been satisfied (YES in step S450), the process returns to step S430. When CPU 150 determines that the condition for retry is not satisfied (NO in step S450), the CPU quits the process in FIGS. 14 to 18.

In step S460, CPU 150 returns a quantity of light from display 171 to the original quantity of light. Thus, display 171 is again turned on in step S460 (for example, sub-figure B-3 of FIG. 5) after it is turned off in step S410 (for example, sub-figure B-2 of FIG. 5).

In this example, "another apparatus" may include biometric authentication apparatus 200. Guidance may be shown and/or audio guidance may be output in biometric authentication apparatus 200.

Referring to FIG. 18, in step S520. CPU 150 performs the authentication processing described with reference to FIG. 19. Thereafter, the process proceeds to step S530.

CPU 150 determines in step S530 whether or not a user has successfully been authenticated based on a result of comparison in step S520 (step SA20 in FIG. 19). When CPU 150 determines that a user has successfully been authenticated (YES in step S530), the process proceeds to step S550. When CPU 150 determines that user authentication has failed (NO in step S530), the process proceeds to step S540.

CPU 150 determines in step S540 whether or not a condition for retry of user authentication has been satisfied. When CPU 150 determines that a condition for retry has been satisfied (YES in step S540), the process returns to step S520. When CPU 150 determines that the condition for retry is not satisfied (NO in step S540), the CPU quits the process in FIGS. 14 to 18.

In step S550, CPU 150 has a user who has successfully been authenticated log in MFP 100. Thereafter, CPU 150 quits the process shown in FIGS. 14 to 18.

[Summary of Disclosure]

(1) In the present disclosure described above, MFP 100 representing one example of an image forming apparatus includes a communication portion (proximity communication portion 173) configured to establish proximity communication with a biometric authentication apparatus (biometric authentication apparatus 200), a display portion (display 171 and an LED of each key of hardware key group 172A), and a control unit (CPU 150) configured to perform authentication processing (the flowchart on the left in FIG. 19) with biological information detected by the biometric authentication apparatus. The control unit is configured to carry out control (FIG. 2) for reducing a quantity of light output from the display portion and incident on the biometric authentication apparatus during detection of the biological information by the biometric authentication apparatus when the control unit receives information representing optical detection of the biological information by the biometric authentication apparatus from the biometric authentication apparatus through the communication portion (YES in step S140).

In one example, while CPU 150 is performing authentication processing (for example, step S250 in FIG. 15), biometric authentication apparatus 200 detects biological information (step SB10 in FIG. 19). CPU 150 performs turn-off processing (step S270 in FIG. 15) before authentication processing (for example, step S250 in FIG. 15). CPU 150 performs guidance representation processing (step S320 in FIG. 15) before authentication processing (for example, step S330 in FIG. 15). Therefore, while biometric authentication apparatus 200 is detecting biological information, a quantity of light from display 171 is reduced.

(2) The control unit may be configured to carry out the control by reducing the quantity of light emitted from the display portion (FIGS. 2, 5, and 6).

(3) The control unit may be configured to turn on the display portion (step S190) after end of detection of the biological information by the biometric authentication apparatus when the control unit receives information representing optical detection of the biological information by the biometric authentication apparatus from the biometric authentication apparatus while the display portion is turned off (YES in step S140).

(4) The image forming apparatus may include an audio output portion (speaker 174). The control unit may be configured to give a notification about execution of the control through at least one of output of voice and sound (sub-figure B of FIG. 6) through the audio output portion and notification by an external display apparatus (notification by "another apparatus" in response to an instruction in step S420) during execution of the control.

(5) The control may include representation of guidance about arrangement of the biometric authentication apparatus on the display portion (representation on display 171 in sub-figure B of FIG. 7).

(6) The image forming apparatus may further include a displacement member (actuator 175) which displaces the display portion. The control unit may be configured to carry out the control by driving the displacement member so as to change an angle of emission of light by the display portion (FIG. 12).

(7) The control unit may be configured to carry out the control (step S240 and step S270) on condition of at least one failure in authentication processing.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
a communication circuit configured to establish proximity communication with a biometric authentication apparatus;
a display; and
a processor configured to perform authentication processing with biological information detected by the biometric authentication apparatus,
the processor being configured to carry out control for reducing a quantity of light from the display incident on the biometric authentication apparatus during detection of the biological information by the biometric authentication apparatus when the processor receives information representing optical detection of the biological information by the biometric authentication apparatus from the biometric authentication apparatus through the communication circuit.

2. The image forming apparatus according to claim 1, wherein
the processor is configured to carry out the control by reducing the quantity of light emitted from the display.

3. The image forming apparatus according to claim 1, wherein
the processor is configured to turn on the display after end of detection of the biological information by the biometric authentication apparatus when the processor receives the information representing optical detection of the biological information by the biometric authentication apparatus from the biometric authentication apparatus while the display is turned off.

4. The image forming apparatus according to claim 1, the image forming apparatus further comprising a speaker, wherein
the processor is configured to give a notification about execution of the control through at least one of sound through the speaker and notification on an external display apparatus during execution of the control.

5. The image forming apparatus according to claim 1, wherein
the control includes representation of guidance about arrangement of the biometric authentication apparatus on the display.

6. The image forming apparatus according to claim 1, the image forming apparatus further comprising an actuator which displaces the display, wherein
the processor is configured to carry out the control by driving the actuator so as to change an angle of emission of light from the display.

7. The image forming apparatus according to claim 1, wherein
the processor is configured to carry out the control on condition of at least one failure in the authentication processing.

8. The image forming apparatus according to claim 2, wherein
the processor is configured to turn on the display after end of detection of the biological information by the biometric authentication apparatus when the processor receives the information representing optical detection of the biological information by the biometric authentication apparatus from the biometric authentication apparatus while the display is turned off.

9. The image forming apparatus according to claim 2, the image forming apparatus further comprising a speaker, wherein
the processor is configured to give a notification about execution of the control through at least one of output of voice and sound through the speaker and notification by an external display apparatus during execution of the control.

10. The image forming apparatus according to claim 2, wherein
the control includes representation of guidance about arrangement of the biometric authentication apparatus on the display.

11. The image forming apparatus according to claim 2, the image forming apparatus further comprising an actuator which displaces the display, wherein
the processor is configured to carry out the control by driving the actuator so as to change an angle of emission of light from the display.

12. The image forming apparatus according to claim 2, wherein
the processor is configured to carry out the control on condition of at least one failure in the authentication processing.

13. The image forming apparatus according to claim 3, the image forming apparatus further comprising a speaker, wherein
the processor is configured to give a notification about execution of the control through at least one of output of voice and sound through the speaker and notification by an external display apparatus during execution of the control.

14. A method of controlling an image forming apparatus including a display and a communication circuit configured to establish proximity communication with a biometric authentication apparatus, comprising:
performing authentication processing with biological information detected by the biometric authentication apparatus; and
executing control for reducing a quantity of light from the display incident on the biometric authentication apparatus during optical detection of the biological information by the biometric authentication apparatus.

15. The method according to claim 14, wherein
the control is executed by reducing the quantity of light emitted from the display.

16. The method according to claim 14, further comprising turning on the display after end of optical detection of the biological information by the biometric authentication apparatus when optical detection of the biological information by the biometric authentication apparatus is performed while the display is turned off.

17. The method according to claim 14, wherein
the image forming apparatus further includes a speaker, and
the method further comprises giving a notification about execution of the control through at least one of sound through the speaker and notification on an external display apparatus during execution of the control.

18. The method according to claim 14, wherein
the control includes representation of guidance about arrangement of the biometric authentication apparatus on the display.

19. The method according to claim 14, wherein
the image forming apparatus further includes an actuator which displaces the display, and
the control includes driving the actuator so as to change an angle of emission of light from the display.

20. The method according to claim 14, wherein
the control is executed on condition of at least one failure in the authentication processing.

* * * * *